(12) United States Patent
Coutu

(10) Patent No.: US 11,725,595 B2
(45) Date of Patent: Aug. 15, 2023

(54) CONTROL LOGIC FOR GAS TURBINE ENGINE FUEL ECONOMY

(71) Applicant: PRATT & WHITNEY CANADA CORP., Longueuil (CA)

(72) Inventor: Daniel Coutu, Longueuil (CA)

(73) Assignee: PRATT & WHITNEY CANADA CORP., Longueuil (CA)

(\*) Notice: Subject to any disclaimer, the term of this patent is extended or adjusted under 35 U.S.C. 154(b) by 0 days.

(21) Appl. No.: 17/648,857

(22) Filed: Jan. 25, 2022

(65) Prior Publication Data

US 2022/0145811 A1    May 12, 2022

Related U.S. Application Data

(62) Division of application No. 16/560,365, filed on Sep. 4, 2019, now Pat. No. 11,274,611.

(Continued)

(51) Int. Cl.
*F02C 9/42* (2006.01)
*F01D 9/04* (2006.01)
(Continued)

(52) U.S. Cl.
CPC .............. *F02C 9/42* (2013.01); *F01D 9/041* (2013.01); *F01D 17/06* (2013.01); *F01D 17/16* (2013.01);
(Continued)

(58) Field of Classification Search
CPC ...... F02C 9/20; F02C 9/42; F02C 9/54; F01D 9/041; F01D 17/06; F01D 17/16;
(Continued)

(56) References Cited

U.S. PATENT DOCUMENTS 1,010,073 A    11/1911   Ream
2,786,331 A     3/1957   Williams et al.
(Continued)

FOREIGN PATENT DOCUMENTS

CA     2965946     3/2018
CN   207935063    10/2018
(Continued)

OTHER PUBLICATIONS

The PW100 Engine: 20 Years of Gas Turbine Technology Evolution, E. Hosking, D. P. Kenny, R. I. McCormick S. H. Moustapha, P. Sampath, A. A. Smailys, presented at the RTO A VT Symposium on "Design Principles and Methods for Aircraft Gas Turbine Engines", held in Toulouse, France, May 11-15, 1998, and published in RTO MP-8-relevant section : p. 4-7, col. 2, lines 5-12.
(Continued)

*Primary Examiner* — Loren C Edwards
(74) *Attorney, Agent, or Firm* — Norton Rose Fulbright Canada LLP

(57) ABSTRACT

A method of operating an engine of a multi-engine aircraft includes sequentially operating the engine through a plurality of cycles, each cycle including a breathing-in phase followed by a breathing-out phase. The breathing-in phase includes: i) in response to a speed of a rotor of the engine being at a sub-idle threshold, opening variable guide vanes upstream a compressor and injecting fuel into the combustor to increase rotor speed to a pre-determined upper threshold, and then ii) in response to the rotor speed reaching the pre-determined upper threshold, reducing a supply rate of fuel into the combustor and substantially closing the variable guide vanes. The breathing-out phase includes maintaining the variable guide vanes closed at least until the speed drops from the pre-determined upper threshold to the pre-determined sub-idle threshold.

15 Claims, 11 Drawing Sheets

Related U.S. Application Data

(60) Provisional application No. 62/855,131, filed on May 31, 2019, provisional application No. 62/855,062, filed on May 31, 2019.

(51) Int. Cl.
  *F01D 17/06* (2006.01)
  *F01D 17/16* (2006.01)
  *F02C 9/54* (2006.01)

(52) U.S. Cl.
  CPC .......... *F02C 9/54* (2013.01); *F05D 2220/323* (2013.01); *F05D 2270/071* (2013.01); *F05D 2270/304* (2013.01)

(58) Field of Classification Search
  CPC ................. F01D 17/162; F01D 17/165; F05D 2220/323; F05D 2270/071; F05D 2270/093; F05D 2270/13; F05D 2270/304
  See application file for complete search history.

(56) References Cited

U.S. PATENT DOCUMENTS

| | | | |
|---|---|---|---|
| 3,325,994 | A | 6/1967 | Frits et al. |
| 3,851,464 | A | 12/1974 | Davis et al. |
| 3,869,862 | A | 3/1975 | Dickey |
| 4,083,181 | A | 4/1978 | Adamson |
| 4,213,738 | A | 7/1980 | Williams |
| 4,217,755 | A | 8/1980 | Williams |
| 4,251,985 | A | 2/1981 | Sullivan |
| 4,625,510 | A | 12/1986 | Evans |
| 4,627,234 | A | 12/1986 | Schuh |
| 4,741,164 | A | 5/1988 | Slaughter |
| 4,900,231 | A | 2/1990 | Kennedy |
| 5,018,601 | A | 5/1991 | Waddington et al. |
| 5,161,364 | A | 11/1992 | Bruun et al. |
| 5,429,208 | A | 7/1995 | Largillier et al. |
| 5,553,461 | A | 9/1996 | Hitzigrath et al. |
| 6,282,882 | B1 | 9/2001 | Dudd, Jr. et al. |
| 6,344,949 | B1 | 2/2002 | Albrecht et al. |
| 6,751,979 | B2 | 6/2004 | Leathers et al. |
| 6,792,746 | B2 | 9/2004 | Saito et al. |
| 6,845,606 | B2 | 1/2005 | Franchet et al. |
| 6,868,664 | B2 | 3/2005 | Albero et al. |
| 6,885,917 | B2 | 4/2005 | Osder |
| 6,921,244 | B2 | 7/2005 | Johnson |
| 7,104,282 | B2 | 9/2006 | Hooker |
| 7,121,078 | B2 | 10/2006 | Turco et al. |
| 7,328,098 | B1 | 2/2008 | VanderLeest et al. |
| 7,464,533 | B2 | 12/2008 | Wollenweber |
| 7,584,618 | B2 | 9/2009 | Amiot et al. |
| 7,584,619 | B2 | 9/2009 | Granitz et al. |
| 7,797,962 | B2 | 9/2010 | Kresser et al. |
| 7,843,354 | B2 | 11/2010 | Holt et al. |
| 7,861,536 | B2 | 1/2011 | Alecu et al. |
| 7,959,109 | B2 | 6/2011 | Dasilva et al. |
| 7,980,052 | B1 | 7/2011 | Paulino |
| 8,245,493 | B2 | 8/2012 | Minto |
| 8,453,462 | B2 | 6/2013 | Wichmann et al. |
| 8,511,058 | B2 | 8/2013 | Agrawal et al. |
| 8,529,189 | B2 | 9/2013 | Brown et al. |
| 8,778,091 | B1 | 7/2014 | Lockyer |
| 8,967,528 | B2 | 3/2015 | Mackin |
| 9,068,463 | B2 | 6/2015 | Pandey et al. |
| 9,068,465 | B2 | 6/2015 | Pandey et al. |
| 9,205,927 | B2 | 12/2015 | Shepard et al. |
| 9,222,578 | B2 | 12/2015 | Long |
| 9,279,341 | B2 | 3/2016 | Durocher et al. |
| 9,297,304 | B2 | 3/2016 | Nordstrom |
| 9,303,562 | B2 | 4/2016 | Codron et al. |
| 9,359,949 | B2 | 6/2016 | Olivarez et al. |
| 9,611,947 | B2 | 4/2017 | Hallisey et al. |
| 9,624,831 | B2 | 4/2017 | Brousseau et al. |
| 9,631,512 | B2 | 4/2017 | Lockyer |
| 9,810,158 | B2 | 11/2017 | Foutch et al. |
| 9,902,500 | B2 | 2/2018 | Stadler et al. |
| 9,903,221 | B2 | 2/2018 | Jacobs et al. |
| 9,995,222 | B2 | 6/2018 | Schwarz et al. |
| 10,054,051 | B2 | 8/2018 | Foutch et al. |
| 10,060,358 | B2 | 8/2018 | Tiwari et al. |
| 10,100,744 | B2 | 10/2018 | Mackin et al. |
| 10,107,206 | B2 | 10/2018 | Forcier et al. |
| 10,125,690 | B2 | 11/2018 | Zaccaria et al. |
| 10,125,691 | B2 | 11/2018 | Feulner et al. |
| 10,138,812 | B2 | 11/2018 | Heaton et al. |
| 10,155,592 | B2 | 12/2018 | McAuliffe et al. |
| 10,293,945 | B2 | 5/2019 | Hoffjann et al. |
| 10,415,468 | B2 | 9/2019 | Ackermann et al. |
| 10,451,491 | B2 | 10/2019 | Chapman |
| 10,458,267 | B2 | 10/2019 | Gibson et al. |
| 10,458,278 | B2 | 10/2019 | Avis et al. |
| 10,461,348 | B2 | 10/2019 | Im et al. |
| 10,487,734 | B2 | 11/2019 | Munsell |
| 10,487,751 | B2 | 11/2019 | DiBenedetto |
| 10,508,601 | B2 | 12/2019 | Sheridan |
| 10,563,590 | B2 | 2/2020 | Coldwate et al. |
| 10,569,887 | B2 | 2/2020 | Valiquette et al. |
| 11,047,257 | B2 | 6/2021 | Chowdhury et al. |
| 2002/0189230 | A1 | 12/2002 | Franchet et al. |
| 2003/0131585 | A1 | 7/2003 | Saito et al. |
| 2004/0168427 | A1 | 9/2004 | Truco et al. |
| 2006/0123796 | A1 | 6/2006 | Aycock et al. |
| 2007/0289285 | A1 | 12/2007 | Jorn |
| 2010/0058731 | A1 | 3/2010 | Haehner et al. |
| 2010/0326085 | A1 | 12/2010 | Veilleux |
| 2011/0202251 | A1 | 8/2011 | Luppold |
| 2011/0271687 | A1 | 11/2011 | Nordstrom et al. |
| 2012/0023962 | A1 | 2/2012 | Wichmann et al. |
| 2012/0139370 | A1 | 6/2012 | Pal |
| 2012/0240588 | A1 | 9/2012 | Patel et al. |
| 2012/0304663 | A1 | 12/2012 | Weber et al. |
| 2013/0040545 | A1 | 2/2013 | Finney |
| 2013/0174574 | A1 | 7/2013 | Heaton |
| 2013/0192251 | A1 | 8/2013 | Munsell |
| 2014/0238042 | A1 | 8/2014 | Munsell et al. |
| 2014/0366547 | A1 | 12/2014 | Kraft et al. |
| 2014/0373551 | A1 | 12/2014 | Kraft et al. |
| 2015/0252731 | A1 | 9/2015 | Riordan |
| 2016/0003144 | A1 | 1/2016 | Kupratis |
| 2016/0123237 | A1 | 5/2016 | Spagnoletti |
| 2016/0237917 | A1 | 8/2016 | Marconi et al. |
| 2016/0273393 | A1 | 9/2016 | Ekanayake |
| 2016/0332737 | A1 | 11/2016 | Sabnis |
| 2016/0369695 | A1 | 12/2016 | Perlak et al. |
| 2017/0016399 | A1 | 1/2017 | Bedrine et al. |
| 2017/0106985 | A1 | 4/2017 | Stieger et al. |
| 2017/0191419 | A1 | 7/2017 | Bayraktar et al. |
| 2017/0210478 | A1 | 7/2017 | Mackin |
| 2017/0268431 | A1 | 9/2017 | Schwarz et al. |
| 2017/0298836 | A1 | 10/2017 | Tiwari |
| 2017/0335772 | A1 | 11/2017 | Coldwate et al. |
| 2017/0369180 | A1 | 12/2017 | Jones |
| 2018/0010520 | A1 | 1/2018 | Iwasaki et al. |
| 2018/0022463 | A1 | 1/2018 | Teicholz et al. |
| 2018/0045115 | A1 | 2/2018 | Glann et al. |
| 2018/0057170 | A1 | 3/2018 | Sautron |
| 2018/0058336 | A1 | 3/2018 | Munevar |
| 2018/0080378 | A1 | 3/2018 | Alecu |
| 2018/0080380 | A1* | 3/2018 | Simonetti .............. B64D 35/08 |
| 2018/0093778 | A1 | 4/2018 | Spack et al. |
| 2018/0128176 | A1 | 5/2018 | Staubach et al. |
| 2018/0135525 | A1 | 5/2018 | Morgan et al. |
| 2018/0201386 | A1 | 7/2018 | Strauss |
| 2018/0334918 | A1 | 11/2018 | Ortiz et al. |
| 2019/0010876 | A1 | 1/2019 | Deroy et al. |
| 2019/0032574 | A1 | 1/2019 | Maguire et al. |
| 2019/0063324 | A1 | 2/2019 | Gould et al. |
| 2019/0232497 | A1 | 8/2019 | Tall et al. |
| 2019/0283887 | A1 | 9/2019 | Ernst et al. |
| 2019/0309683 | A1 | 10/2019 | Mackin et al. |
| 2019/0323426 | A1 | 10/2019 | Mackin |
| 2019/0368417 | A1 | 12/2019 | Terwilliger |
| 2019/0383167 | A1 | 12/2019 | Schwarz et al. |

(56) References Cited

U.S. PATENT DOCUMENTS

| | | |
|---|---|---|
| 2019/0383220 A1 | 12/2019 | Mackin |
| 2020/0032702 A1 | 1/2020 | Kupratis |
| 2020/0095931 A1 | 3/2020 | Vinski |
| 2020/0248627 A1 | 8/2020 | Amari |
| 2022/0228532 A1 | 7/2022 | Takaki |

FOREIGN PATENT DOCUMENTS

| | | |
|---|---|---|
| EP | 1923575 | 5/2008 |
| EP | 2267288 | 12/2010 |
| EP | 2407652 | 1/2012 |
| EP | 3095703 | 11/2016 |
| EP | 3282094 | 2/2018 |
| EP | 3318727 | 5/2018 |
| EP | 3323727 | 5/2018 |
| WO | 2012007341 | 1/2012 |
| WO | 2013154630 | 10/2013 |
| WO | 2014033220 | 3/2014 |

OTHER PUBLICATIONS

John H. Perepezko, The Hotter the Engine, the Better, Nov. 20, 2009, AAAS, SCIENCE, www.sciencemag.org vol. 326, pp. 1068-1069.

S. Kuz'michev, V. N. Rybalko, A. Y. Tkachenko and I. N. Krupenich, Optimization of Working Process Parameters of Gas Turbine Engines Line On the Basis of Unified Engine Core, ARPN Journal of Engineering and Applied Sciences, vol. 9, No. 10, Oct. 2014, ISSN 1819-6608, p. 1877.

\* cited by examiner

```
┌─────────────────────┐     ┌──────────────────────────────────────────────────┐     ┌──────────────────────┐
│ Operating the a     │     │ Operating a second engine of a multi-engine      │     │ In response to the   │
│ engine of a multi-  │ ──▶ │ aircraft in a standby mode to provide            │ ──▶ │ rotational speed     │
│ engine aircraft to  │     │ substantially no motive power to the aircraft,   │     │ reaching the upper   │
│ provide motive      │     │ and in the standby mode, sequentially executing  │     │ threshold,           │
│ power to the        │     │ cycles with respect to the second engine, a      │     │ modulating the set   │
│ aircraft.           │     │ given cycle of the cycles including: a) in       │     │ of variable guide    │
└─────────────────────┘     │ response to a rotational speed of a rotor of the │     │ vanes toward a fully │
                            │ second engine reaching a threshold below the     │     │ closed position.     │
                            │ substantially constant idle rotational speed of  │     └──────────────────────┘
                            │ the second engine, modulating a set of variable  │
                            │ guide vanes upstream a compressor section of the │
                            │ second engine toward a fully open position, and  │
                            │ b) at least in part concurrently with the        │
                            │ modulating toward the open position, spiking a   │
                            │ rate of a fuel flow to a combustor of the second │
                            │ engine, the spiking and the opening timed to     │
                            │ increase a rotational speed of the rotor of the  │
                            │ second engine to a threshold above the           │
                            │ substantially constant idle rotational speed.    │
                            └──────────────────────────────────────────────────┘
```

FIG. 10

CONTROL LOGIC FOR GAS TURBINE ENGINE FUEL ECONOMY

CROSS-REFERENCE

The present application is a divisional of U.S. patent application Ser. No. 16/560,365 filed Sep. 4, 2019, which claims the benefit of priority to U.S. Patent Application No. 62/855,062 filed May 31, 2019 and U.S. Patent Application No. 62/855,131 filed on May 31, 2019, the entire contents of each of which is incorporated herein by reference.

TECHNICAL FIELD

The disclosure relates to methods of operating an engine of a multi-engine aircraft.

BACKGROUND OF THE ART

Helicopters may have two or more engines powering a main rotor via a common reduction gearbox, and each of the engines is typically sized such that the power of each engine is greater than what is required by the helicopter in cruise. Improving operating fuel efficiencies of such multi-engine systems is desirable.

SUMMARY

In an aspect, there is provided a method of operating a multi-engine aircraft having a first engine and a second engine operable to power the aircraft, the second engine having a rotor operable at a substantially constant idle rotational speed resulting from a substantially constant idle fuel supply rate to a combustor of the second engine, comprising: operating the first engine of the multi-engine aircraft to provide motive power to the aircraft; and operating the second engine of the multi-engine aircraft in a standby mode to provide substantially no motive power to the aircraft, and in the standby mode, sequentially executing cycles with respect to the second engine, a given cycle of the cycles including: in response to a rotational speed of the rotor of the second engine reaching a threshold below the substantially constant idle rotational speed, modulating a set of variable guide vanes upstream a compressor section of the second engine toward a fully open position, at least in part concurrently with the modulating toward the open position, spiking a rate of a fuel flow to a combustor of the second engine, the spiking and the opening timed to increase a rotational speed of the rotor of the second engine to a threshold above the substantially constant idle rotational speed, and in response to the rotational speed reaching the upper threshold, modulating the set of variable guide vanes toward a fully closed position.

In some embodiments, the spiking the rate includes increasing the rate is to an upper supply rate, the increasing the rate is followed by the decreasing the rate to a lower supply rate, the upper supply rate is lower than a minimum fuel supply rate required for the second engine to provide motive power to the aircraft and greater than the substantially constant idle fuel supply rate required to maintain rotation of the rotor at a substantially constant idle rotation speed of the engine, the lower supply rate is lower than the upper fuel supply rate, and the modulating the set of variable guide vanes toward the fully open position is followed substantially immediately by the modulating the set of variable guide vanes toward the fully closed position.

In some embodiments, the lower supply rate is lower than the substantially constant idle fuel supply rate, and the upper supply rate is greater than the substantially constant idle fuel supply rate.

In some embodiments, the modulating toward the fully open position includes modulating to the fully open position and the modulating toward the fully closed position includes modulating to the fully closed position.

In some embodiments, the given cycle includes a breathing-in phase followed by a breathing-out phase, and the breathing-in phase includes: i) executing the modulating toward the fully open position simultaneously with at least part of the increasing the rate, followed by ii) the modulating toward the fully closed position simultaneously with at least part of the decreasing the rate.

In some embodiments, the breathing-out phase includes maintaining the set of variable guide vanes in the fully closed position.

In some embodiments, the breathing-out phase includes maintaining the rate at the lower supply rate.

In another aspect, there is provided a method of operating multiple engines of an aircraft, comprising: operating a first engine of the multiple engines to provide motive power to the aircraft; and operating a second engine of the multiple engines in a standby mode to provide substantially no motive power to the aircraft, the operating the second engine in the standby mode including maintaining rotation of a rotor of the second engine by sequentially executing cycles, each cycle of the cycles including: opening a set of variable guide vanes upstream a compressor section of the second engine from a closed position to an open position, increasing at least in part simultaneously with the opening the set of variable guide vanes, increasing a supply rate of a fuel flow to a combustor of the second engine from a lower supply rate to an upper supply rate, with the fuel flow reaching the upper supply rate substantially simultaneously with the set of variable guide vanes reaching the open position, and substantially simultaneously with the set of variable guide vanes reaching the reaching the open position, moving the set of variable guide vanes to the closed position and decreasing the supply rate of the fuel flow from the upper supply rate to the lower supply rate.

In another aspect, there is provided a method of operating a multi-engine aircraft, comprising: operating a first engine of the multi-engine aircraft to provide motive power to the aircraft; and operating a second engine of the multi-engine aircraft in a standby mode to provide substantially no motive power to the aircraft, a rotor of the second engine having an idle rotational speed in the standby mode, and in the standby mode, sequentially executing cycles, a given cycle of the cycles including: opening a set of variable guide vanes upstream a compressor section of the second engine, spiking a rate of a fuel flow to a combustor of the second engine, the spiking and the opening timed to increase a rotational speed of the rotor of the second engine to an upper threshold above the idle rotational speed of the rotor, and in response to the rotational speed reaching the upper threshold, at least substantially closing the set of variable guide vanes.

In some embodiments, the increasing the rate is to an upper supply rate, the increasing the rate is followed by the decreasing the rate to a lower supply rate, the upper supply rate is lower than a minimum fuel supply rate required for the engine to provide motive power to the aircraft and greater than a minimum constant fuel supply rate required to maintain rotation of the rotor at a substantially constant idle rotation speed of the engine, the lower supply rate is lower than the upper fuel supply rate, and the opening the set of variable guide vanes is followed by the closing the set of variable guide vanes.

In some embodiments, the lower supply rate is lower than a minimum fuel supply rate required to maintain rotation of the rotor at a substantially constant idle rotation speed of the second engine, and the upper supply rate is lower than a minimum fuel supply rate required for the second engine to provide motive power to the aircraft and greater than the minimum constant fuel supply rate required to maintain rotation of the rotor at the substantially constant idle rotation speed of the second engine.

In some embodiments, the decreasing the rate is started substantially immediately after an end of the increasing the rate, the closing the set of variable guide vanes is started substantially immediately after an end of the opening the set of variable guide vanes, the opening the set of variable guide vanes is simultaneous with at least part of the increasing the rate, and the closing the set of variable guide vanes is simultaneous with at least part of the decreasing the rate.

In some embodiments, the given cycle includes a breathing-in phase followed by a breathing-out phase, and the breathing-in phase includes: i) the opening the set of variable guide vanes simultaneously with at least part of the increasing the rate, followed by ii) the closing the set of variable guide vanes simultaneously with at least part of the decreasing the rate.

In some embodiments, the breathing-out phase includes maintaining the set of variable guide vanes closed.

In some embodiments, the closing the set of variable guide vanes includes completely closing the set of variable guide vanes, and the breathing-out phase includes maintaining the rate at the lower supply rate.

In some embodiments, the lower supply rate is a zero supply rate.

In some embodiments, the method further comprises monitoring a rotor speed of the engine, and in response to the rotor speed decreasing to a pre-determined sub-idle threshold during the breathing-out phase of a given cycle of the plurality of cycles, terminating the breathing-out phase of the given cycle and starting the breathing-in phase of a sequentially next cycle of the plurality of cycles.

In some embodiments, during the breathing-in phase of the sequentially next cycle, the increasing the rate to the upper supply rate starts substantially immediately after the rotor speed reaches the pre-determined threshold during the breathing-out phase of the given cycle.

In some embodiments, during the breathing-in phase of the sequentially next cycle the opening the set of variable guide vanes starts at one of: i) a substantially same time as a start of increasing the rate, and ii) a pre-determined time after the start of increasing the rate.

In another aspect, there is provided a method of operating an engine of a multi-engine aircraft, comprising: operating the engine through a sequential plurality of cycles, a given cycle of the plurality of cycles including a breathing-in phase followed by a breathing-out phase, the breathing-in phase including: i) in response to a speed of a rotor of the engine being at a sub-idle threshold, opening a set variable guide vanes upstream an air compressor section of the engine and injecting a fuel into a combustor of the engine to increase the speed to at least approximately a pre-determined upper threshold, and then ii) in response to the speed reaching at the upper threshold, at least reducing a supply rate of the fuel into the combustor and at least substantially closing the set of variable guide vanes, the breathing-out phase including maintaining the set of variable guide vanes closed at least until the speed drops from the pre-determined upper threshold to at least approximately the pre-determined sub-idle threshold.

In some embodiments, in the breathing-in phase of at least one repeating cycle of the plurality of cycles, the at least reducing the rate starts before a start of the closing the set of variable guide vanes.

In some embodiments, in the breathing-in phase of at least one repeating cycle of the plurality of cycles, the opening the set of variable guide vanes starts at least approximately simultaneously with the injecting the fuel, and the injecting the fuel includes increasing a supply rate of the fuel into the combustor.

In some embodiments, the at least reducing the rate includes reducing the rate to a zero supply rate.

In another aspect, there is provided a multi-engine aircraft, comprising: a first engine operable to provide motive power to the aircraft; a second engine operable to provide motive power to the aircraft; at least one controller operatively connected to the first and second engines and configured to operate the first engine in a sub-idle mode while operating the second engine in an active mode, the sub-idle mode including sequentially executing a plurality of cycles, a given cycle of the plurality of cycles including a breathing-in phase followed by a breathing-out phase, the breathing-in phase including: i) modulating a set of variable guide vanes upstream an air compressor section of the first engine to an open position, and a fuel supply to a combustor of the first engine to an upper supply rate, followed by ii) modulating the set of variable guide vanes to a substantially closed position, and the fuel supply to a lower supply rate that is lower than the upper supply rate, the breathing-out phase including maintaining the set of variable guide vanes closed.

In some embodiments, the at least one controller is configured to start the modulating the fuel supply to the lower supply rate substantially immediately after terminating the modulating the fuel supply to the upper supply rate, and to start the modulating the set of variable guide vanes to the closed position substantially immediately after terminating the modulating the set of variable guide vanes to the open position.

In some embodiments, the at least one controller is configured to switch operation of the first engine from the sub-idle mode into an active mode of the first engine at any point in time during operation of the first engine in the sub-idle mode.

In some embodiments, the modulating the fuel supply to the lower supply rate followed by modulating the fuel supply to the upper supply rate is part of spiking the fuel supply to the combustor of the first engine.

In some embodiments, the at least one controller is configured to start the spiking at least substantially simultaneously with starting the modulating the set of variable guide vanes to the open position, and to terminate the spiking at least substantially simultaneously with terminating the modulating the set of variable guide vanes to the closed position.

DESCRIPTION OF THE DRAWINGS

Reference is now made to the accompanying figures in which:

FIG. 10 is a schematic logic diagram showing a method implemented according to an embodiment of the present technology.

DETAILED DESCRIPTION

Figure 1:
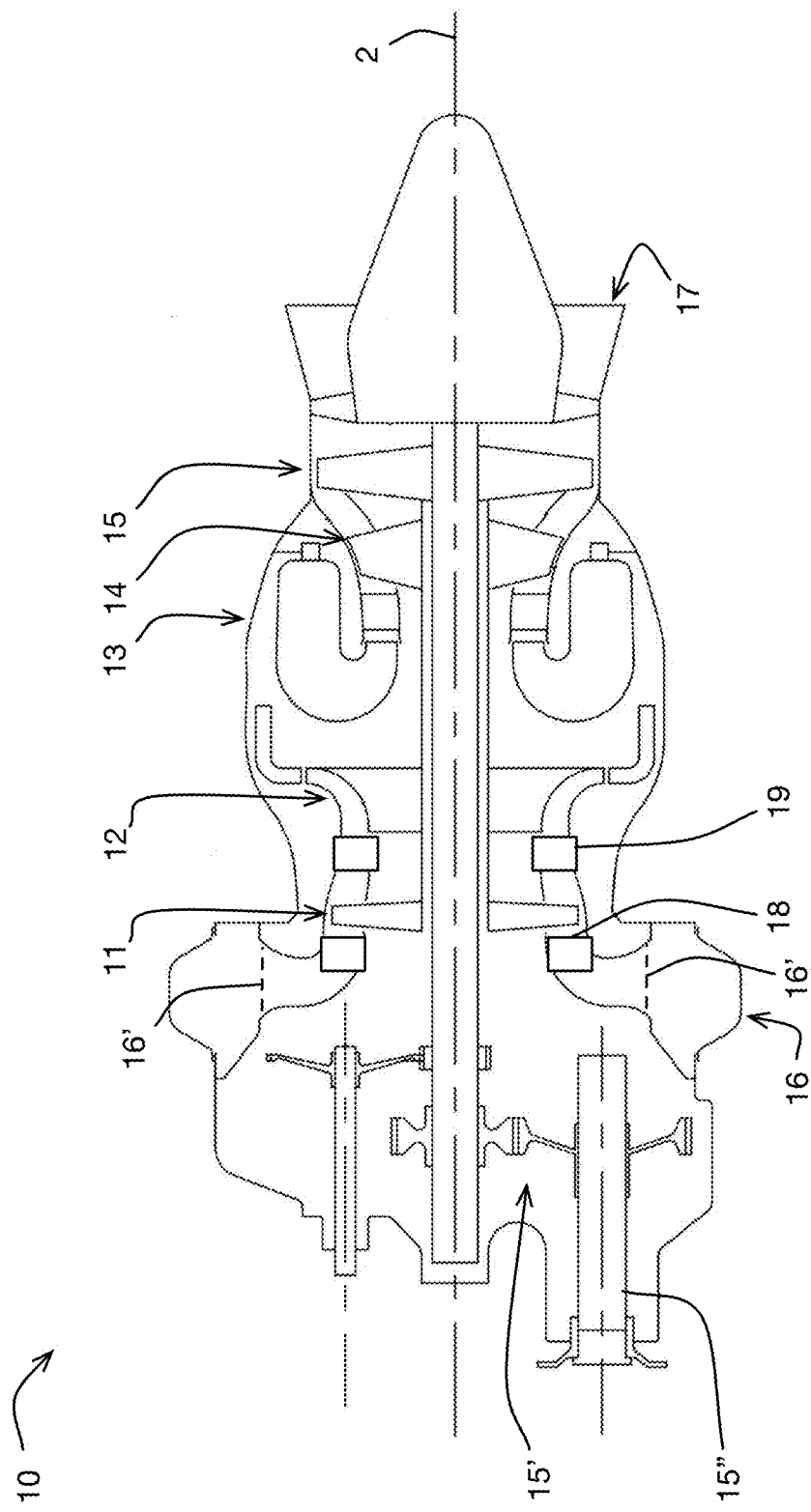
FIG. 1 is a schematic cross sectional view of a gas turbine engine.

FIG. 1 illustrates an example of a gas turbine engine 10. In this example, the gas turbine 10 is a turboshaft engine 10 generally comprising in serial flow communication a low pressure (LP) compressor section 11 and a high pressure (HP) compressor section 12 for pressurizing air, a combustor 13 in which the compressed air is mixed with fuel and ignited for generating an annular stream of hot combustion gases, a high pressure (HP) turbine section 14, and a lower pressure (LP) turbine section 15. The respective pairs of the compressor and turbine sections 11, 12, 14, 15 are interconnected via respective independently rotatable low pressure and high pressure spools, or shafts. This arrangement enables, inter alia, the core flow and processing of air through the engine 10, which is received through an air inlet 16 and exhausted via an exhaust outlet 17 of the turboshaft engine 10.

The turboshaft engine 10 further includes a set of variable guide vanes 18, 19 at an inlet of one or both of the compressor sections 11, 14. In other words, relative to a direction of airflow through the core of the turboshaft engine 10, a set of variable guide vanes 18 may be provided upstream of the LP compressor section 11 to modulate airflow into the LP compressor section 11. A set of variable guide vanes 19 may be provided upstream of the HP compressor section 12 to modulate airflow into the HP compressor section 12 and to modulate a power output of the turboshaft engine 10. The HP compressor section 12 is sometimes referred to as the 'gas generator' of the engine 10.

The turboshaft engine 10 may include a transmission 15' driven by the LP turbine section 15 via the low pressure shaft and driving a rotatable output shaft 15". In some embodiments, the transmission 15' may vary a ratio between rotational speeds of the low pressure shaft and the output shaft 15".

Figure 2:
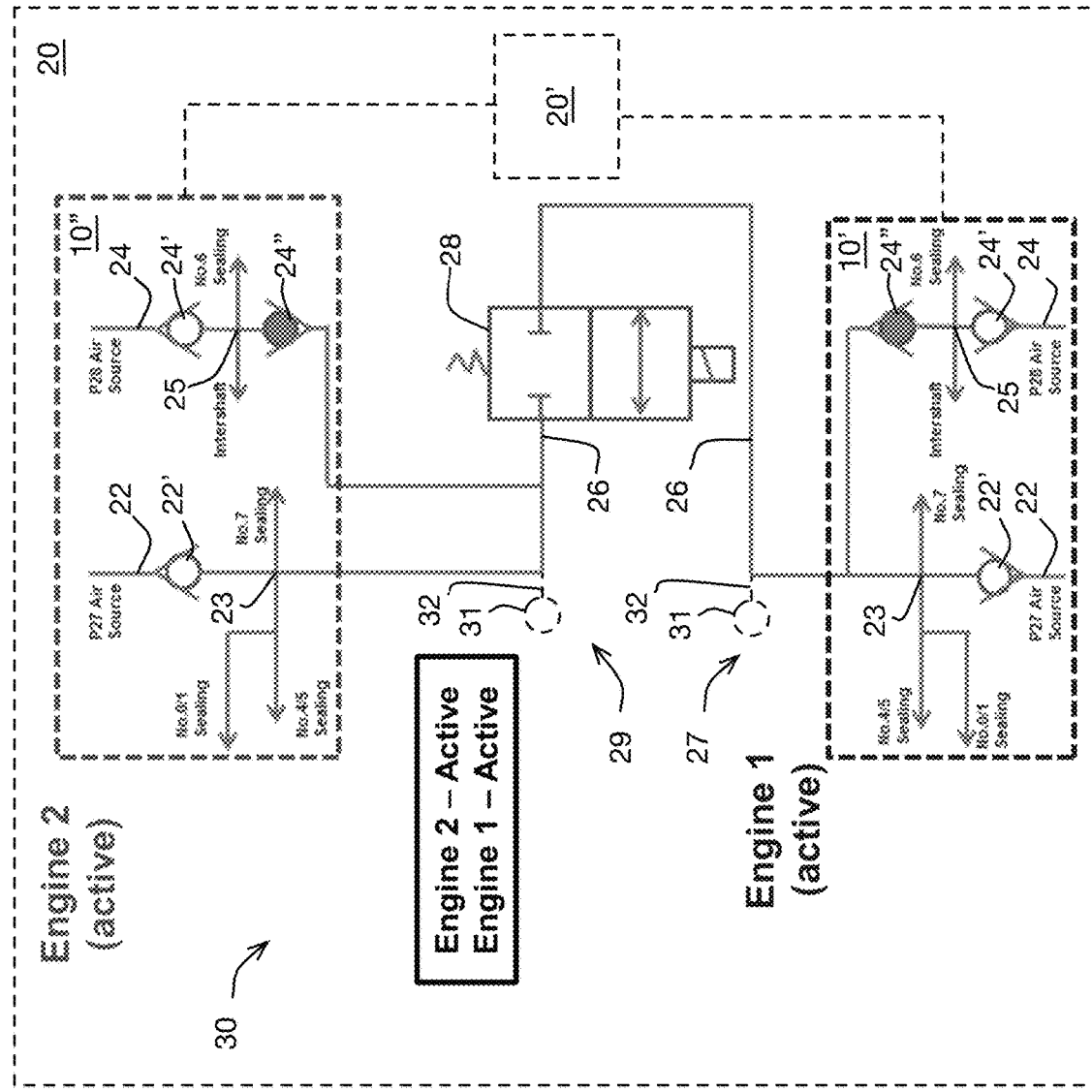
FIG. 2 is a schematic of two gas turbine engines and of an air system of an aircraft, with both of the engines being active.

FIG. 2 schematically illustrates an aircraft 20, in this non-limiting example a helicopter, having a first engine 10', and a second engine 10". The technology as described herein may be implemented with respect to a prior art multi-engine helicopter, and therefore a particular helicopter is not shown or described in detail. For simplicity, only the non-conventional aspects of the present technology are described in detail in this document. In other embodiments, the aircraft 20 may be of a different type, such as an airplane for example.

The engines 10', 10" are operable to provide motive power to the aircraft 20 via, for example, one or more conventional transmission systems, which include the transmission 15' shown in FIG. 1, and conventional controls. In this embodiment, each of the engines 10', 10" is substantially the same as engine 10 shown in FIG. 1 and described above. Therefore, only the first engine 10' is described in further detail. Parts of the second engine 10" that correspond to parts of the first engine 10' are labeled with the same numerals.

As shown schematically in FIG. 2, the first engine 10' includes a first bleed air conduit 22 and a second bleed air conduit 24, both of which bleed compressed air from respective parts of the LP and HP compressor sections 11, 12 of the first engine 10'. In the present embodiment, the first bleed air conduit 22 includes a check valve 24' and branches off into supply bleed air conduits 23 downstream of the check valve. In this embodiment, the second bleed air conduit 24 includes a check valve 24' and a check valve 24". The second bleed air conduit 24 branches off into supply bleed air conduits 25 at one or more locations that are fluidly in between the check valves 24', 24". As shown, the check valves 24', 24" are pointing toward each other, for purposes explained below.

The supply bleed air conduits 23, 25 deliver bleed air to various sealing and lubrication systems of the first engine 10'. The particular number and configuration of the sealing systems may be any suitable number and configuration, and is therefore not described in detail. The supply bleed air conduits 23 and 25 may also provide bleed air for various other functions of the first engine 10' and/or the aircraft. Examples of such functions include, but are not limited to, cooling of turbines, maintenance of cabin pressure, operation of air systems, and pressurizing liquid tanks. Any suitable air piping and controls arrangement may be used to provide for each particular combination of the functions provided for by the bleed air from the first and second bleed air conduits 22, 24.

Still referring to FIG. 2, the first and second bleed air conduits 22, 24 of the first engine 10' fluidly converge/join into a common bleed air conduit 26. The common bleed air conduit 26 fluidly connects to a control valve 28. The control valve 28 may be any suitable one or more control valves so long as it provides for the functionality described in this document. The conduits 22, 23, 24, 25, 26 and valves 22', 24', 24" of the first engine 10' are part of a bleed air system 27 of the first engine 10'.

As noted above, in this embodiment, the bleed air system 27 bleeds compressed air, via conduits 22 and 24, from the LP compressor section 11 and the HP compressor section 12 of the first engine 10', and supplies it to various parts of the first engine 10' including bearing assemblies for sealing and intershaft for lubrication. It is contemplated that the bleed air system 27 may have a different combination of functions and/or other functions. The rest of the bleed air system 27 may be conventional and is therefore not shown or described in detail herein. Details of the bleed air system 27 that are not shown or described herein may be conventional, and are omitted to maintain clarity of this description.

As shown in FIG. 2, in the present embodiment, the bleed air system 29 of the second engine 10" is similar to the bleed air system 27 of the first engine 10', described above.

Therefore, to maintain simplicity of this description, the bleed air system 29 of the second engine 10" is not described in detail. Suffice it to say that parts of the bleed air system 29 of the second engine 10" that correspond to parts of the bleed air system 27 of the first engine 10' are labeled with the same numerals. Each of the bleed air systems 27, 29 of the aircraft 20 is sized and designed to provide all of its functions at least when the engine 10', 10" that has the bleed air system 27, 29 is in an "active" mode (i.e. providing motive power to the aircraft 20). However, as described in more detail later in this document, each of the engines 10', 10" in this embodiment is also configured to operate an idling mode, and in some embodiments in a "sub-idle" mode while at least another one of the engines 10', 10" is in an active mode.

For the purposes of this document, the term "active" used with respect to a given engine means that the given engine is providing motive power to the aircraft with which it is used. For the purposes of this document, the terms "standby", "idle" and "sub-idle" are used with respect to a given engine to mean that the given engine is operating but is providing no motive power, or at least substantially no motive power, to the aircraft with which it is used, with the "sub-idle" operation being a particular type of standby operation according to the various embodiments described in this document.

In the "sub-idle" mode, the engine 10', 10" operates at a power level at which the engine 10', 10" provides no motive power, or substantially motive power, to the aircraft 20. In at least some operating conditions, while in the sub-idle mode, and but-for the selective air interconnection between the bleed air systems 27, 29 described below, a given engine 10', 10" may not provide sufficient pressure and/or supply rate of bleed air to its bleed air system 27, 29 in order to enable that bleed air system 27, 29 to provide all of its intended functions.

For the purposes of this document, the term "self-sufficient" used with respect to a given bleed air system of a given engine means that the given bleed air system of the given engine provides all of its intended functions for the duration of the time during which it is called upon to provide the functions. A given bleed air system of a given engine is not "self-sufficient" when one or more of the intended functions of the given bleed air system may be unavailable or unstable due to a lack of bleed air pressure and/or bleed air supply rate provided by the corresponding engine to the given bleed air system. The selective air interconnection between the bleed air systems 27, 29 provides for "self-sufficient" of each of the bleed air systems 27, 29 when the engine 10', 10" having that bleed air system 27, 29 operates in a sub-idle mode. A non-limiting embodiment of the selective air interconnection according to the present technology is described next, in detail.

As shown in FIG. 2, the common bleed air conduit 26 of the second engine 10", similar to the common bleed air conduit 26 of the first engine 10', fluidly connects to a control valve 28. The control valve 28 is operable by a controller of the aircraft 20 to selectively: i) fluidly connect the common bleed air conduit 26 of the first engine 10' to the common bleed air conduit 26 of the second engine 10", and ii) fluidly disconnect the common bleed air conduit 26 of the first engine 10' from the common bleed air conduit 26 of the second engine 10", as illustrated by the internal structure of the control valve 28 schematically shown in FIG. 2. The control valve 28 may be actuated using any suitable actuator of the engines 10', 10" and/or of the aircraft 20.

Figure 3:
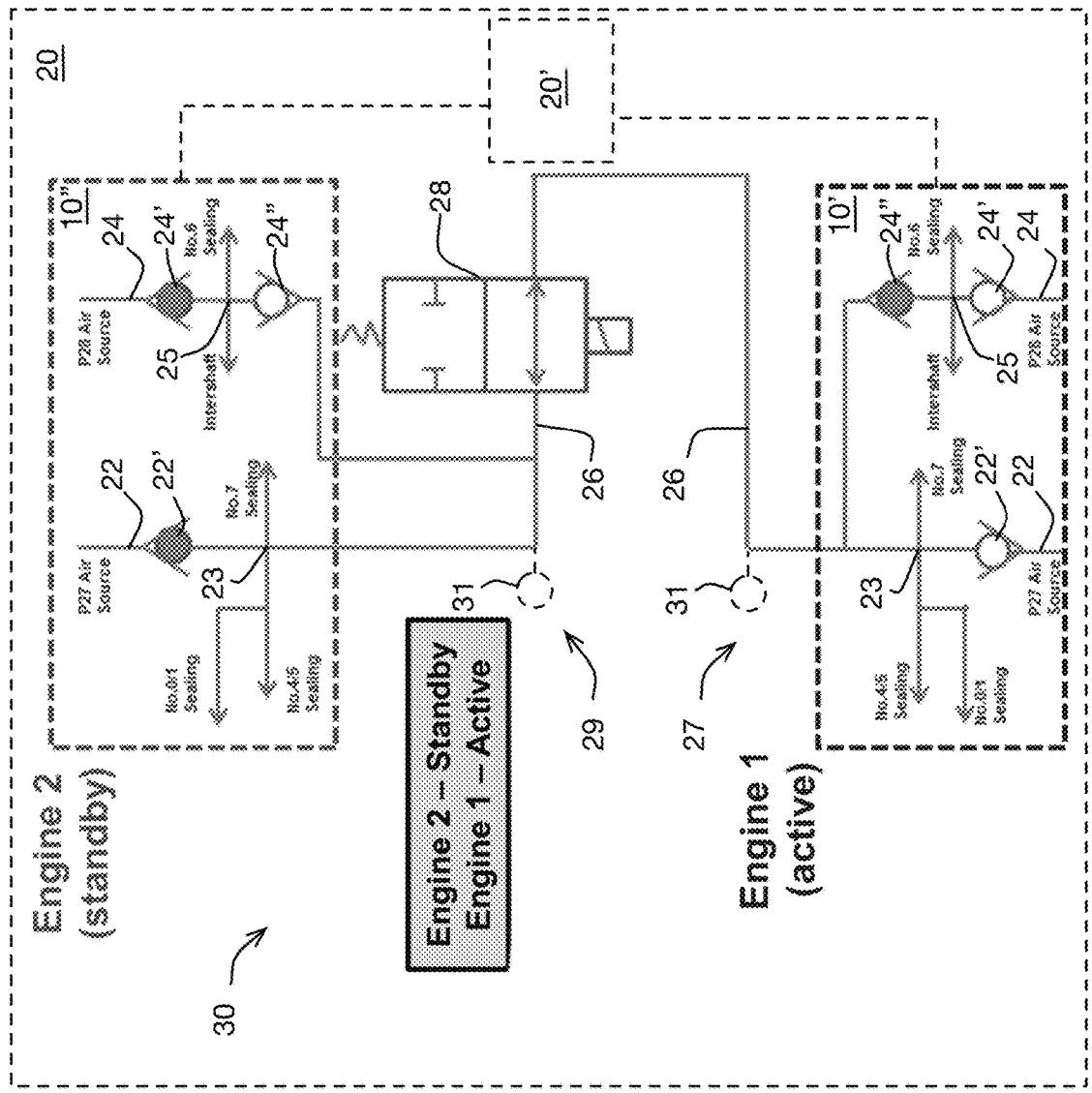
FIG. 3 is a schematic of the two gas turbine engines and of the air system of FIG. 2, with one of the engines being active and another one of the engines being on standby.

FIG. 2 shows a first in-flight, cruise, mode of operation of the aircraft 20 during which both engines 10', 10" are operating in an active mode, and are therefore both providing motive power to the aircraft 20. In this operating condition, the bleed air system 27 of the first engine 10' and the bleed air system 29 of the second engine 10" are both self-sufficient without a need to use the control valve 28. Reference is now made to FIG. 3, which shows a second in-flight, cruise, mode of operation of the aircraft 20 during which: i) the first engine 10' is "active" and is therefore providing motive power to the aircraft 20, and ii) the second engine 10" is operating in a sub-idle mode and is therefore not providing any material amount of motive power to the aircraft 20. In this operating condition (i.e. in the second in-flight mode of operation), the bleed air system 27 of the first engine 10' is self-sufficient. On the other hand, depending on each particular embodiment of the engines 10', 10" and/or the aircraft 20 and/or on the characteristics of the particular sub-idle operation of the second engine 10", the bleed air system 29 of the second engine 10" may or may not be self-sufficient in the sub-idle mode.

For this reason, during the second in-flight mode of operation of the aircraft 20, the control valve 28 may be actuated by a suitable controller of the aircraft 20 to fluidly connect the common bleed air conduit 26 of the first engine 10' to the common bleed air conduit 26 of the second engine 10", to provide for an additional supply of bleed air from the bleed air system 27 of the first engine 10' to the bleed air system 29 of the second engine 10". The common bleed air conduit 26, the throughput of the control valve 28, and the size of the bleed air system 27 may be selected so as to provide enough of a flow and pressure of the additional supply of bleed air to the bleed air system 29 so as to enable self-sufficient operation of the bleed air system 29 simultaneously with self-sufficient operation of the bleed air system 27, with the second engine 10" being in sub-idle mode. Conventional engineering principles may be used to provide for such sizing, to suit each particular embodiment and/or application of the aircraft 20.

After the second engine 10" is brought into an "active" state while the first engine 10' is in an "active" state, the control valve 28 may be actuated by a suitable controller of the aircraft 20 to fluidly disconnect the common bleed air conduit 26 of the first engine 10' from the common bleed air conduit 26 of the second engine 10", as shown in FIG. 2. After the first engine 10' is put into a standby mode or a sub-idle mode while the second engine 10" is in an "active" mode, the control valve 28 may be actuated by a suitable controller of the aircraft 20 to fluidly connect the common bleed air conduit 26 of the first engine 10' to the common bleed air conduit 26 of the second engine 10".

The bleed air system 29 of the second engine 10" may thereby provide compressed air to the bleed air system 27 of the first engine 10'. Similarly, the common bleed air conduit 26, the throughput of the control valve 28, and the size of the bleed air system 29 may be selected so as to provide enough of a flow and pressure of the additional supply of bleed air to the bleed air system 27 so as to enable self-sufficient operation of the bleed air system 27 simultaneously with self-sufficient operation of the bleed air system 29, with the first engine 10' being in sub-idle mode. Self-sufficiency of both of the bleed air systems 27, 29 of the aircraft 20 during all modes of operation of the engines 10', 10" may thereby be provided.

Further, the sub-idle mode of operation as described herein has been developed as a way to improve upon prior art methods of idle operation of one or more aircraft engines, and is therefore not part of the prior art as of the time of writing this description. However, the selective air interconnection of two or more engines of an aircraft as described herein may be implemented in multi-engine aircraft, such as at least some helicopters, in which one or more of the engines are operable in a prior art idle mode. The bleed air systems 27, 29 of the engines 10', 10" and the control valve 28 are part of an air system 30 of the aircraft 20. As described above, the air system 30 of the aircraft 20 implemented according to the present technology may therefore provide for self-sufficient operation of at least one of the engines 10', 10" and/or the engines' 10', 10" bleed air system(s) 27, 29 in at least some operating conditions of the aircraft 20 in which at least some prior art engines and/or engine bleed air systems may not be self-sufficient.

Further according to the present technology, as shown in FIGS. 2 and 3 for example, in the present embodiment, the check valves 24' and 24" are provided in the bleed air conduits 24, downstream of the branching-out bleed air conduits 25. In this embodiment, this the branching-out bleed air conduits 25 may supply compressed air to at least some subsystems of the respective engines 10', 10". Each of the check valves 24' and 24" ensures that when the engine 10', 10" having that check valve 24', 24" is providing compressed air from its bleed air system 27, 29 to the bleed air system 27, 29 of the other engine 10', 10", the compressed air is provided from the air source corresponding to the bleed air conduit 22 of that engine 10', 10". The check valves 24' and 24" therefore help ensure uncompromised self-sufficient operation of the subsystems of the one of the engines 10', 10" that may at a given time be providing compressed air to the other one of the engines 10', 10". In some embodiments, the check valve 24' and/or the check valve 24" may be omitted.

The rest of the air system 30 that is not shown in the figures of the present application may be conventional and is therefore not described in detail herein. Any suitable controls and any suitable control logic may be used to provide for the functionality of the air system 30, and/or for various timings of actuation of the control valve 28 to suit the various different operations of the aircraft 20.

Figure 4:
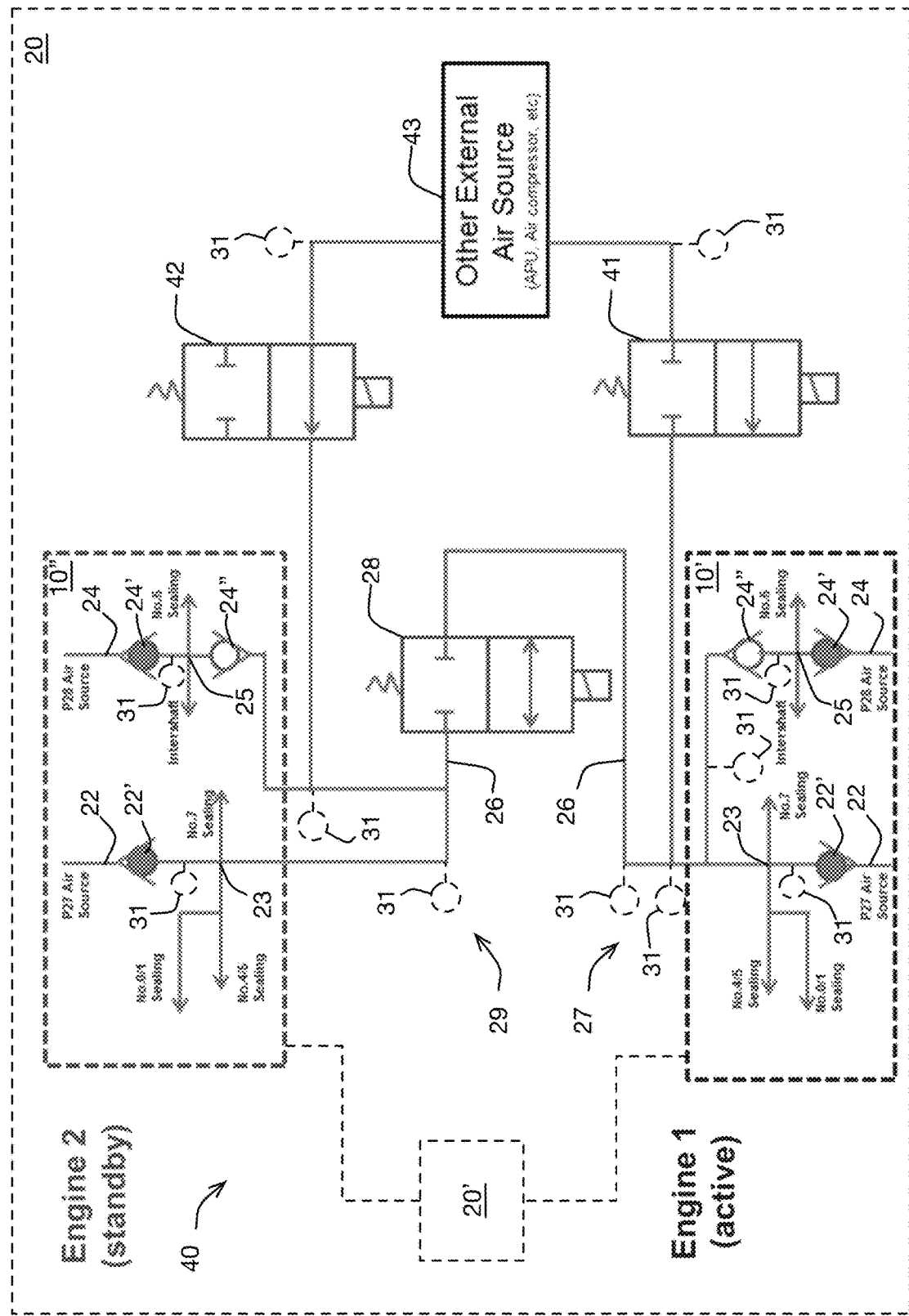
FIG. 4 is a schematic of two gas turbine engines and of the air system of the aircraft of FIG. 2, the air system being implement according to another embodiment.

Referring now to FIG. 4, an air system 40 of the aircraft 20, which is an alternative embodiment of the air system 30 is shown. The air system 40 is similar to the air system 30, and therefore similar reference numerals have been used for the air system 40. A difference of the air system 40 from the air system 30, is that air system 40 includes a control valve 41, a control valve 42, and an external compressed air source 43 such as an auxiliary power unit (APU) and/or an air compressor for example. The external compressed air source 43 may be any conventional external compressed air source suitable for each particular embodiment of the engines 10', 10" and the aircraft 20.

The control valve 41 selectively fluidly connects the external compressed air source 43 to the common bleed air conduit 26 of the first engine 10', via any suitable corresponding air conduits. More particularly, when the first engine 10' is "active", the control valve 41 may be actuated by a suitable controller of the aircraft 20 to fluidly disconnect the external compressed air source 43 from the common bleed air conduit 26 of the first engine 10', and may thereby allow the bleed air system 27 of the first engine 10' to run self-sufficiently.

When the first engine 10' is in a sub-idle mode according to the present technology (further, simply "in a sub-idle mode"), or on "standby" according to prior art methods, the control valve 41 may be actuated by a suitable controller of the aircraft 20 to fluidly connect the external compressed air source 43 to the common bleed air conduit 26 of the first engine 10'. The control valve 41 may thereby provide that additional/"supplemental" compressed air to the bleed air system 27 of the first engine 10' at a supply rate and pressure sufficient to allow the bleed air system 27 of the first engine 10' to provide for all of its intended functions during sub-idle or standby operation of the first engine 10'. The control valve 41, via corresponding air conduit(s), may selectively fluidly connect the external compressed air source 43 to a different part of the bleed air system 27 of the first engine 10', so long as the functionality described above is provided.

The control valve 42 similarly fluidly connects the external compressed air source 43 to the common bleed air conduit 26 of the second engine 10", and is actuated according to a similar control logic to allow the bleed air system 29 of the second engine 10" to provide for all of its intended functions during sub-idle or standby operation of the second engine 10". As shown, the control valve 28 that fluidly connects the bleed air system 27 of the first engine 10' to the bleed air system 29 of the second engine 10" may be in a position in which it fluidly disconnects the first engine 10' from the second engine 10", to allow for the supplemental compressed air to be provided to either one, or to both, of the engines 10', 10" by the external compressed air source 43. In some embodiments, the control valves 28, 41, 42 may be actuated correspondingly to switch between the various possible supply modes of air described above. For example, in some operating conditions, the bleed air system 27, 29 of one of the engines 10', 10" may receive "supplemental" compressed air from one or both of: i) the bleed air system 27, 29 of another one of the engines 10', 10", and ii) the external compressed air source 43.

Figure 5:
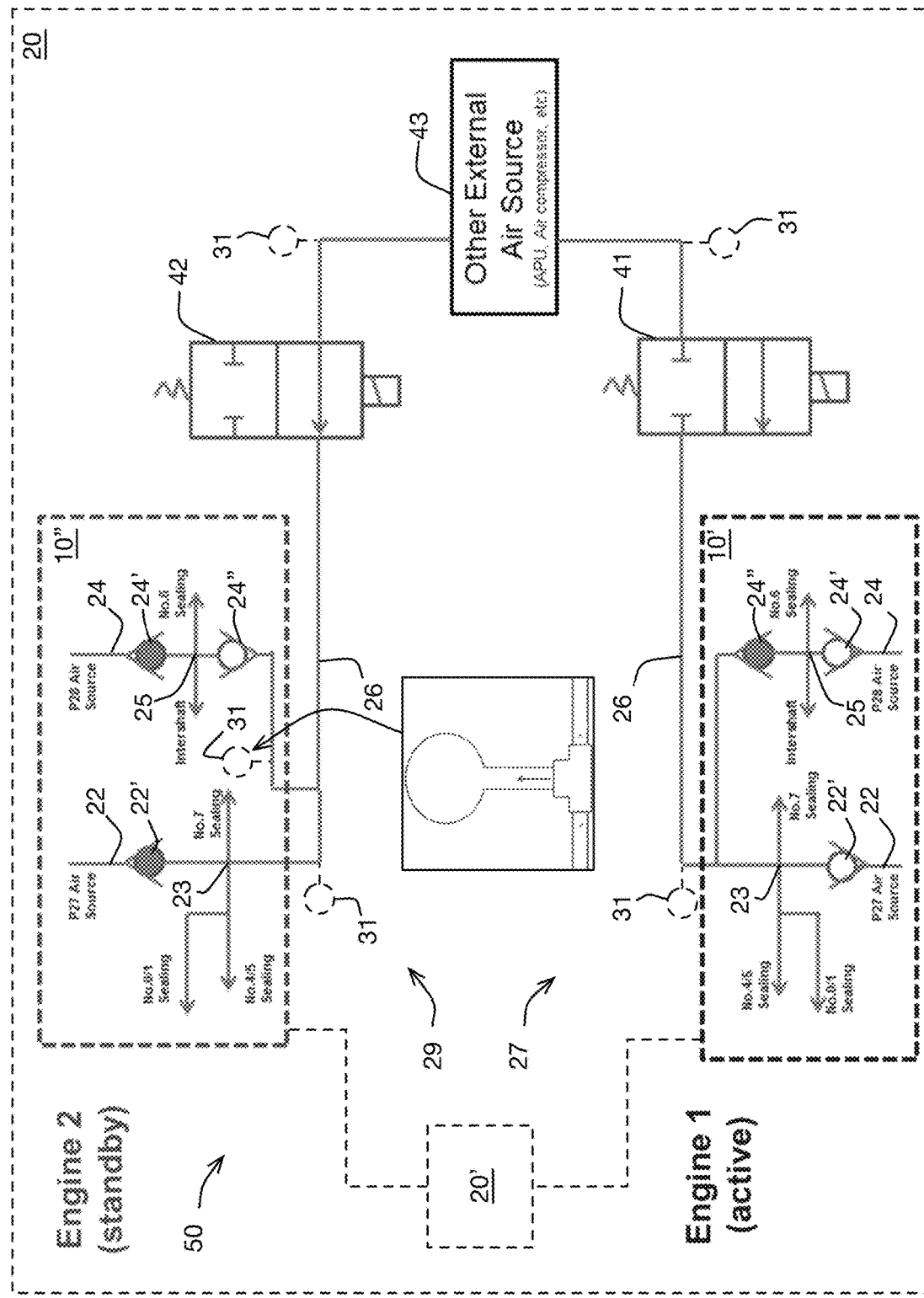
FIG. 5 is a schematic of two gas turbine engines and of the air system of the aircraft of FIG. 2, the air system being implement according to yet another embodiment.
Figure 6:
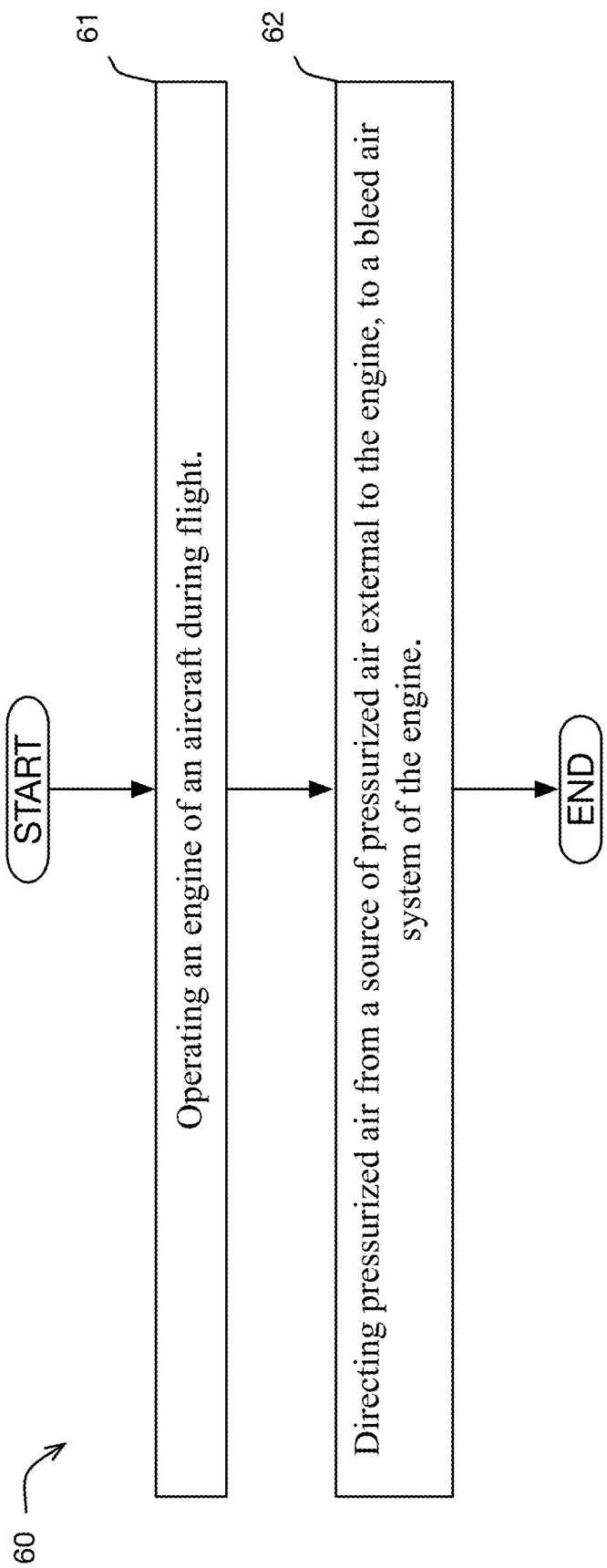
FIG. 6 is a schematic logic diagram showing a method implemented according to an embodiment of the present technology.
Figure 7:
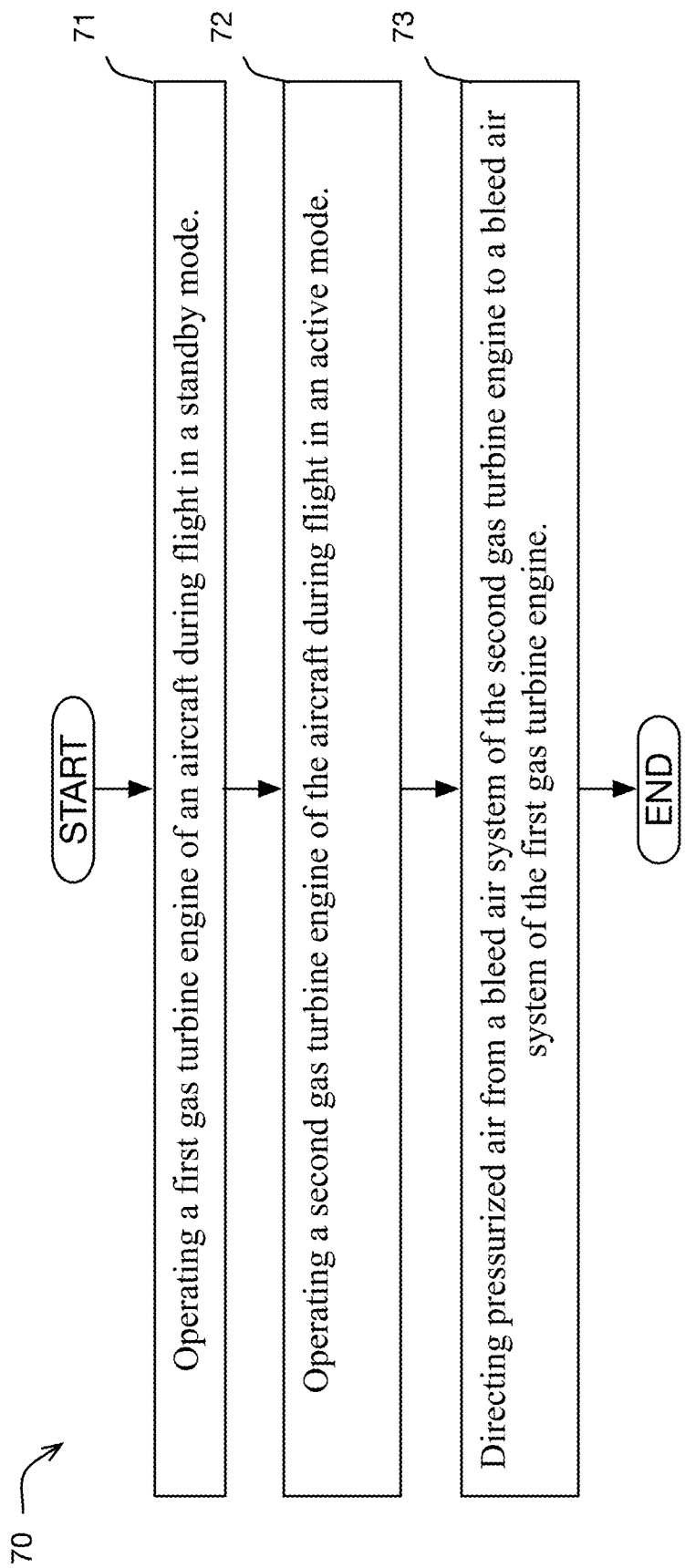
FIG. 7 is a schematic logic diagram showing a method implemented according to another embodiment of the present technology.

Referring now to FIG. 5, an air system 50 of the aircraft 20, which is yet another alternative embodiment of the air system 30 is shown. The air system 50 is similar to the air system 40, and therefore similar reference numerals have been used for the air system 50. A of the air system 50 difference from the air system 40, is that air system 50 does not have a control valve 28 for fluidly connecting the bleed air system 27 of the first engine 10' to the bleed air system 29 of the second engine 10". Operation of the air system 50 is similar to operation of the air system 40 with respect to the external compressed air source 43.

In at least some embodiments and applications, the air systems 30, 40, 50 may allow to provide "supplemental" compressed air to the bleed air system 27, 29 of one of the engines 10', 10" in at least some cases where that bleed air system 27, 29 is malfunctioning and/or leaking air for example. A person skilled in the art will appreciate that while a particular air conduit arrangement is shown in FIGS. 1 to 5, other air conduit arrangements may be used while providing for at least some of the functionality described in this document. While a single external compressed air source 43 is used in the embodiments of FIGS. 4 and 5, multiple different external compressed air sources may be used. Likewise, while the example aircraft 20 has two engines 10', 10", the present technology may be implemented with respect to more than two engines and/or with respect to other types of engines.

With the above systems in mind, the present technology provides a method 60 of using, in flight, a source of pressurized air external to an engine of an aircraft 20. As seen above, in some embodiments and operating conditions, the source of pressurized air may be one of the engines 10', 10" of the aircraft 20, and in some embodiments, an APU 43 or air compressor 43 of the aircraft 20. In some embodiments, the method 60 includes a step 61 of operating a given engine 10', 10" of the aircraft 20 during flight. In some embodiments, the method 60 also includes a step 62 of directing pressurized air from the source of pressurized air external to the given engine 10', 10", to a bleed air system 27, 29 of the given engine 10', 10".

In some embodiments, the given engine 10', 10" to which pressurized air is directed is a first engine 10' of the aircraft 20, the aircraft 20 includes a second engine 10", and the source of pressurized air external to the first engine 10' is a bleed air system 29 of the second engine 10". As seen above, in some embodiments, the aircraft 20 is a multi-engine helicopter in which the engines 10', 10" are operatively connected to drive at least one main rotor of the helicopter to provide motive power to/propel the helicopter.

As seen above, in some embodiments, the directing pressurized air to the bleed air system 27 of the first engine 10' is executed when the first engine 10' is operating in a sub-idle mode on or standby. In embodiments in which the source of the pressurized air is the bleed air system 29 of the second engine 10", the second engine 10" is active (i.e. providing motive power to the helicopter). Similarly, in some operating conditions during flight, the given engine 10', 10" to which pressurized air is directed is a second engine 10" of the aircraft 20. In some such cases, the source of pressurized air external to the second engine 10" is a bleed air system 27 of the first engine 10'. In some such cases, the second engine 10" is operating in a sub-idle mode or on standby while the first engine 10' providing the compressed air is active (i.e. providing motive power to the helicopter).

As seen above, in some embodiments, the source of pressurized air is a first source of pressurized air (e.g. first engine 10' or second engine 10", depending on which of these engines is active and which is in sub-idle operation or on standby), the aircraft 20 includes a second source of pressurized air (e.g. APU/air compressor 43 of the aircraft 20). In some such embodiments, the second source of pressurized air 43 is external to both the first engine 10' and the second engine 10". In some such embodiments and in some flight conditions, the method 60 comprises directing pressurized air from the second source of pressurized air 43 to the first engine 10'. In some such embodiments and in some flight conditions, the method 60 comprises directing pressurized air from the second source of pressurized air 43 to the second engine 10". Further in some such embodiments and in some flight conditions, the method 60 comprises directing pressurized air from the second source of pressurized air 43 to both the first engine 10' and the second engine 10".

Further with the structure of the aircraft 20 described above, the present technology also provides method 70 of operating a bleed air system 27 of a first gas turbine engine 10' of a multi-engine aircraft 20 during flight. In some embodiments, the method 70 comprises a step 71 of operating the first gas turbine engine 10' of the aircraft 20 during flight in a sub-idle or in a standby mode, such as an idle or a sub-idle mode that provides either no motive power or at least materially no motive power to the aircraft 20. In some embodiments, the method 70 comprises a step 71 of operating a second gas turbine engine 10" of the aircraft 20 during flight in an active mode (i.e. providing non-substantially-zero motive power to the aircraft 20).

In some cases, the steps 71 and 72 are executed simultaneously. In some such cases, the method 70 comprises directing pressurized air from a bleed air system 29 of the second gas turbine engine 10" to a bleed air system 27 of the first gas turbine engine 10'.

In some cases, the method 70 further includes a step 73 of operating a source of pressurized air (E.g. APU/air compressor 43, and the like) of the aircraft 20 external to both the first gas turbine engine 10' and the second gas turbine engine 10", and a step of directing pressurized air from the source of pressurized air 43 to at least one of the first gas turbine engine 10' and the second gas turbine engine 10".

In some cases, the directing pressurized air from one of the bleed air systems 27, 29 to the other one of the bleed air systems 27, 29 (depending on which one of the bleed air systems 27, 29 requires supplemental compressed air) may be executed simultaneously with directing pressurized air from a second source of pressurized air to the one of the bleed air systems 27, 29 that is receiving the supplemental compressed air. In some embodiments, the second source of pressurized air 43 includes, or is, at least one of: an APU 43 of the aircraft 20, and an air compressor 43 of the aircraft 20.

In some such cases, the air pressure in the one of the bleed air systems 27, 29 receiving supplemental compressed air may be lower than the pressure of the supplemental compressed air. It is contemplated that any suitable controls and control arrangements may be used to provide for this pressure differential, where required. While two engines 10', 10" of an aircraft 20 are described, it is contemplated that the present technology could be implemented with regard to a larger number of engines of an aircraft to provide supplemental compressed air from one or more of the engines or other compressed air source(s), to one or more other ones of the engines.

In at least some cases and in at least some embodiments, the technology described above may be implemented with, and may help provide stable sub-idle operation of one or more engines of a multi-engine aircraft. Operating one or more of an aircraft's multiple engines in a sub-idle mode according to the present technology is described in detail next.

Figure 8:
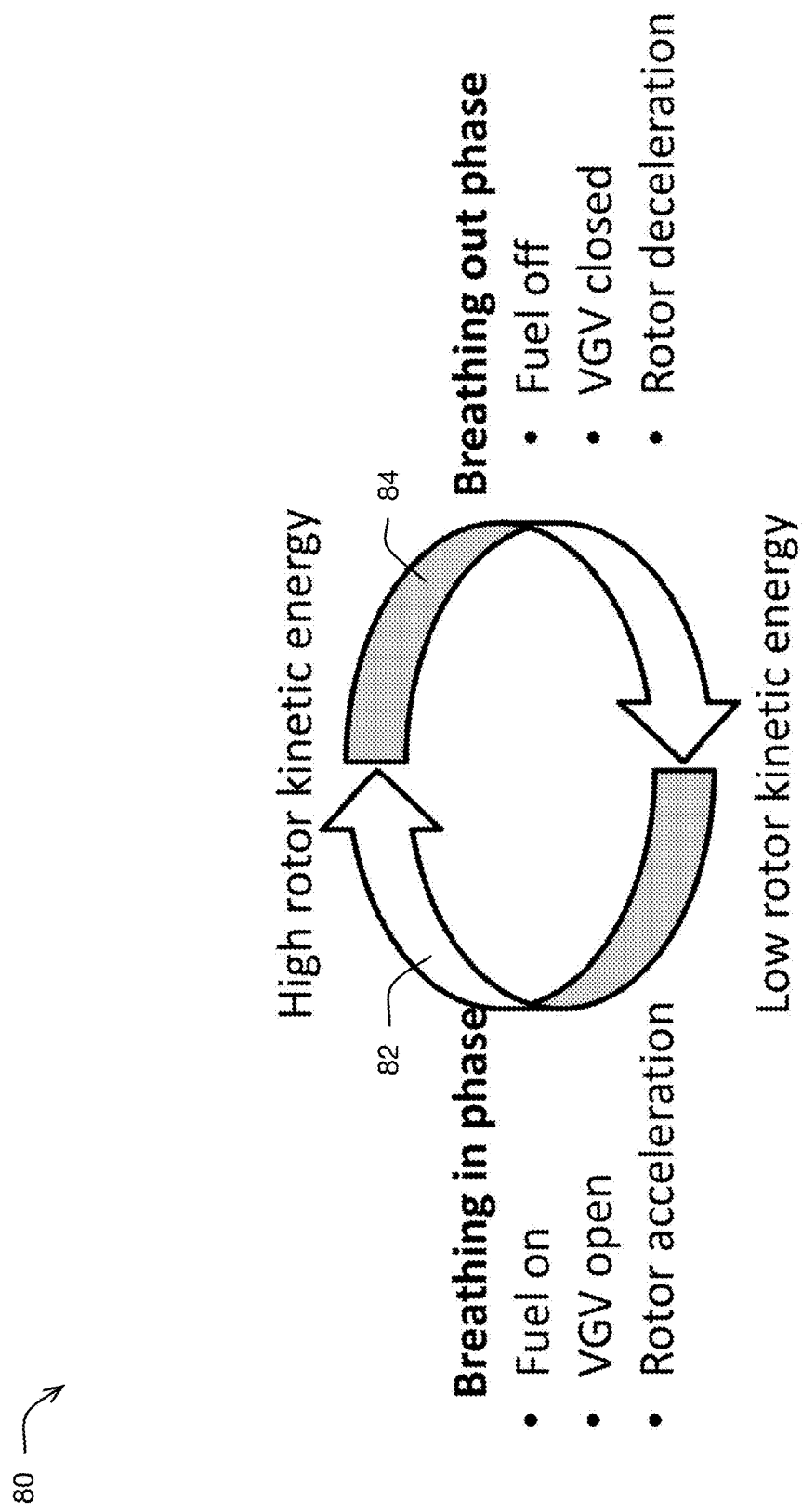
FIG. 8 is a schematic showing a breathing cycle of the present technology, when implemented with respect to the engine of FIG. 1.

Referring to FIG. 8, the present technology provides a sub-idle mode 80 of operation of an aircraft engine 10, 10', 10". The present embodiment of the sub-idle mode 80 is illustrated with respect to the engine 10 of FIG. 1, but may be executed with regard to a different aircraft engine as well, such as one of the engines 10' and 10" of the aircraft 20 described above.

Operating the engine 10 in sub-idle mode 80 according to the present technology uses one or more of the rotor(s), such as corresponding ones of the shafts/compressors/turbines 11, 12, 14, 15, of the engine 10 as energy accumulators, by varying the speed(s) of the rotor(s) of the engine 10 during repeating predetermined time intervals from a low to a high level, as described herein. It has been found by the developers of the present technology that the sub-idle mode 80 helps provide a lower overall fuel consumption over a given operating time period in comparison with at least some prior art stand-by methods applied to similar sized/powered engines in at least some similar applications and/or operating conditions.

As shown in FIG. 8, in the present embodiment, the sub-idle mode 80 includes a breathing-in phase 82 and a breathing-out phase 84, executed in a repeating sequence. In this embodiment, and although need not be the case in other embodiments, the repeating sequential phases 82, 84 are executed with respect to each of the rotors, and more particularly with respect to both the rotor defined by the LP compressor and turbine sections 11 and 15, and the rotor defined by the HP compressor and turbine sections 12 and 14. In other applications and depending on the embodiment of a given engine with respect to which the method 80 may be applied, the phases 82, 84 may be executed with respect to one or more but not all of the rotors having a corresponding set of variable guide vanes upstream thereof. In some embodiments, the phases 82, 84 may be executed with respect to more than two rotors of a given engine, in cases where each of the more than two rotors of the particular engine has a corresponding upstream set of variable guide vanes. In some embodiments, and depending on the embodiment and-or application of a given engine 10, 10', 10" and its one or more rotors, the phases 82, 84 executed as described herein with regard to a given one of the rotor(s) of the engine 10, 10', 10" may have variations, such as different magnitudes and-or timings of the various parts of the phases 82, 84, relative to the phases 82, 84 executed with regard to a different one or more of the rotors of that engine 10, 10', 10".

In the present embodiment, the breathing-in phase 82 includes opening, or open, the variable guide vanes 18, 19 at the air inlet 16 of the engine 10, and supplying fuel to the combustor 13 of the engine 10 while combustion is occurring therein or while initiating combustion, until the rotors 11, 12, 14, 15 have reached an upper pre-determined level of kinetic energy. In some embodiments, the upper pre-determined level of kinetic energy corresponds to a speed of the engine 10 at or above an idle speed of the engine 10.

Once the upper pre-determined level of kinetic energy is reached, a breathing-out phase 84 may be executed. As shown, the present embodiment, the breathing-out phase 84 includes closing the variable guide vanes 18, 19 at the air inlet 16 of the engine 10 and reducing fuel flow to the combustor 13 of the engine 10 to at least one level that is below an idle speed of the engine 10. In some embodiments, the fuel flow is terminated during the breathing-out phase 84.

In an aspect, the closing of the variable guide vanes 18, 19 at the air inlet 16 during each breathing-out phase 84 limits entry of air into the engine 10 and thereby reduces drag and other losses at the rotors 11, 12, 14, 15 of the engine 10. This helps conserve, for as long as possible, the kinetic energy stored in the rotors 11, 12, 14, 15 as a result of a sequentially preceding breathing-in phase 82. Rotating the rotors 11, 12, 14, 15 of the engine 10 with the variable guide vanes 18, 19 at the air inlet 16 being closed to restrict airflow through the air inlet 16 is referred to herein as a lower drag mode.

According to the present embodiment, the breathing-out phase 84 is executed until the kinetic energy in the rotors 11, 12, 14, 15 drops to a lower pre-determined level of kinetic energy, at which point a sequentially next breathing-in phase 82 is executed to restore the kinetic energy to the upper pre-determined level for a sequentially next breathing-out phase 84. The breathing-in phases 82 and the breathing-out phases 84 are executed sequentially one after the other to provide for the sub-idle mode 80 of operation of the engine 10. In an aspect, in at least some embodiments and applications of the engine 10, the sub-idle mode 80 allows to reduce fuel consumed by the engine 10 over a given time period, in comparison with prior-art idle operation methods that, for example, may run the engine 10 at a constant idle speed. In another aspect, in at least some embodiments and applications of the engine 10, the sub-idle mode 80 allows the engine 10 to respond quickly to a sudden power demand stemming from the application in which the engine 10 is used.

Figure 9:
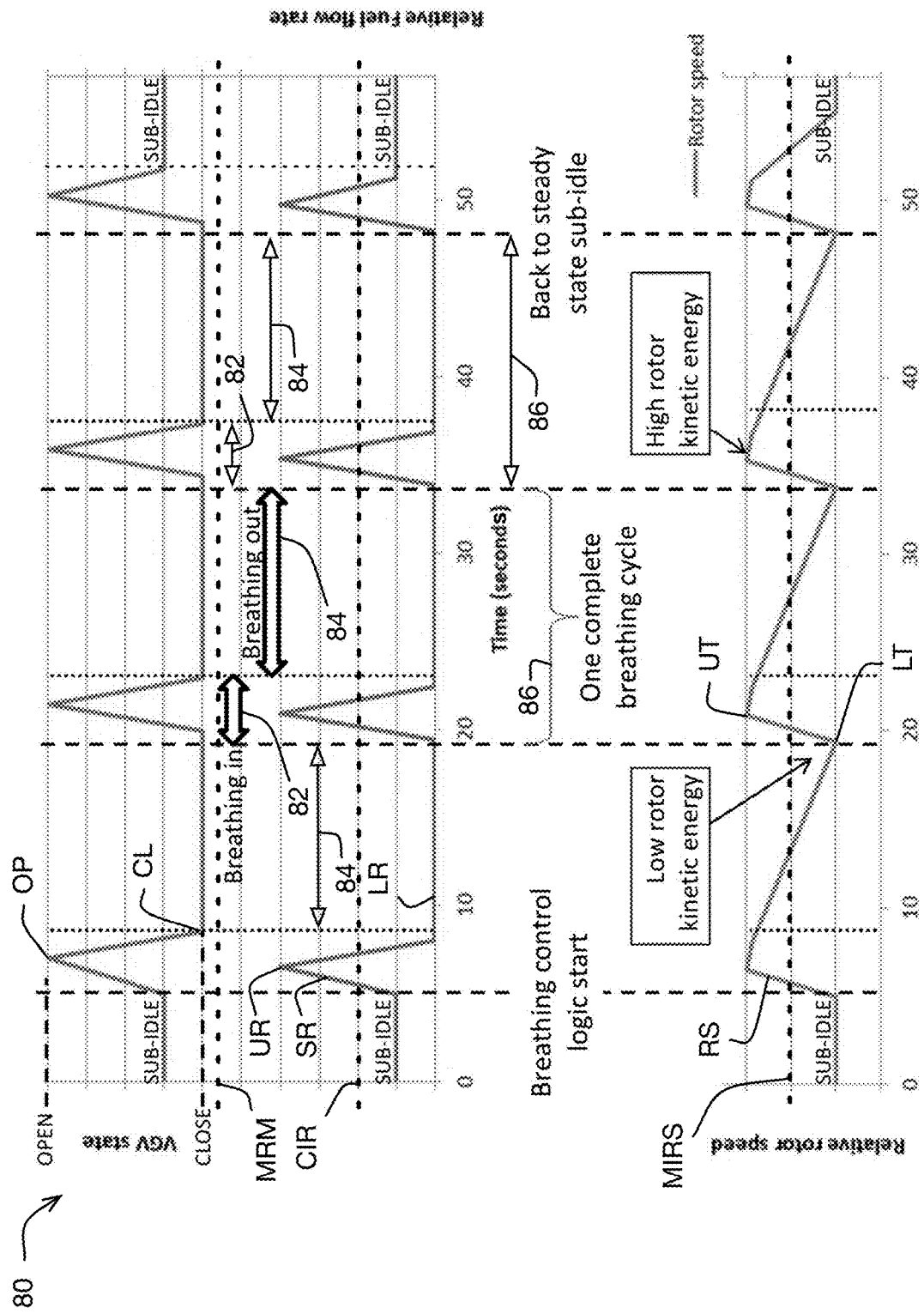
FIG. 9 is a schematic showing the breathing cycle of FIG. 8 in more detail.

Now referring to FIG. 9, the breathing-in phases 82 and the breathing-out phases 84 of the sub-idle mode 80 of the present embodiment are shown and described in more detail. As shown, the breathing-in phases 82 all have one and the same VGV and fuel-flow profile, and the breathing-out phases 84 all have one and the same VGV and fuel-flow profile. However, it is contemplated that in other embodiments the breathing-in phases 82 and/or the breathing-out phases 84 could each include more than one profile. More particularly, the breathing-in phases 82 and the breathing-out phases 84 of the present technology may be executed with respect to an engine 10, 10', 10" in a sequential series of cycles 86, each of which may include a breathing-in phase 82 followed by a breathing-out phase 84. Executing a sequential series of the cycles 86 with respect to an engine 10, 10', 10" may provide for sub-idle operation of the engine 10, 10', 10" which maintains rotation of the engine's rotors 11, 12, 14, 15 and allows the engine 10, 10', 10" to be ready to quickly respond to a sudden demand for motive power from that engine 10, 10', 10".

More particularly, with the above structure in mind and now referring to FIGS. 9 and 10, there is provided a method 88 of operating an engine 10, 10', 10" of a multi-engine aircraft 20. In some embodiments, the method 88 includes operating the engine 10, 10', 10" in a sub-idle mode, such as the sub-idle mode shown in FIG. 9. As shown in FIG. 9, in some embodiments, the sub-idle mode includes, in response to a rotational speed of the rotors 11, 12, 14, 15 of the engine 10, 10', 10" reaching a threshold (LT) below a substantially constant idle rotational "MIRS" speed of the rotors 11, 12, 14, 15, which in some cases may be a rated constant idle rotational speed of the rotors 11, 12, 14, 15, opening/modulating a set of variable guide vanes, such as the set of variable guide vanes 18 and/or 19 shown in FIG. 1, upstream of one or more air compressor sections, such as the LP compressor section 11 and/or the HP compressor section 19, of the engine 10, 10', 10", toward a fully open position "OP".

Also as shown in FIGS. 9 and 10, in some embodiments, the method 88 includes executing, at least in part concurrently with the modulating toward the fully open position "OP", increasing a supply rate (shown as the slope of the fuel flow graph labeled "SR" in FIG. 9) of a fuel to the combustor 13 of the engine 10, 10', 10" to an upper supply rate "UR". As shown, in the present embodiment, the increasing the fuel supply rate may be part of spiking the fuel supply rate from a sub-idle rate such as a lower supply rate "LR" (described below) to the upper supply rate "UR" and at least substantially immediately upon reaching the upper supply rate "UR", reducing the fuel supply rate back to the lower supply rate "LR". As shown, in some such embodiments, a rate of the increase may at least substantially equal a rate of the decrease. Also, as shown by the respective slopes of each vane 18, 19 opening and concurrent fuel spiking phase mapped over a common time scale, and although this need not be the case in other embodiments, the spiking the fuel supply rate "SR" and the modulating the vanes 18, 19 may be timed for the fuel supply rate "SR" to reach the peak sub-idle rate "UR" at least substantially concurrently with the vanes 18, 19 reaching their fully open position (shown at the peak of each given set of vane modulation in FIG. 9).

As shown, in some such embodiments, the upper supply rate "UR" is lower than a minimum fuel supply rate "MRM" required for the engine 10, 10', 10" to provide a material amount of motive power (or simply, "to provide motive power") to the aircraft 20, and greater than a minimum constant fuel supply rate "CIR", which may in some cases be a rated constant idle fuel supply rate of the engine 10, required to maintain rotation of the rotors 11, 12, 14, 15 at the substantially constant idle rotation speed "MIRS" of the engine 10, 10', 10". The minimum fuel supply rate "MRM", the minimum constant fuel supply rate "CIR", and the substantially constant idle rotation speed "MIRS" may be a function of each particular embodiment and type of engine 10, 10', 10" and/or the aircraft 20 and/or the application with which the present technology is used, and may be different and in at least some cases may be specified by the manufacturer(s) for each particular embodiment and type of engine 10, 10', 10"/aircraft 20/application.

In some embodiments, the method 88 includes closing/modulating the set(s) of variable guide vanes 18 toward a fully closed position "CL",19, and decreasing the supply rate "SR" of the fuel to a lower supply rate "LR" that is lower than the upper supply rate "UR", to maintain rotation of the rotors 11, 12, 14, 15 of the engine 10, 10', 10". As shown, in some embodiments, the lower supply rate "LR" is a zero supply rate, meaning that the flow of fuel to the combustor 13 is shut off. However, in other embodiments and depending on the particular embodiment of the engine 10, 10', 10" for example, the lower supply rate "LR" is a non-zero supply rate, but is in at least some cases lower than the minimum constant fuel supply rate "CIR" required to maintain rotation of the rotors 11, 12, 14, 15 at the substantially constant idle rotation speed "MIRS" of the engine 10, 10', 10".

Also as shown in FIG. 9, in each given breathing cycle 86, the increasing the supply rate "SR" to the upper supply rate "UR" is followed by the decreasing the supply rate "SR" to the lower supply rate "LR", and the opening/modulating the set(s) of variable guide vanes 18, 19 toward the fully open position "OP" is followed by the closing/modulating the set(s) of variable guide vanes 18, 19 toward the fully closed position "CL". Yet further as shown in FIG. 9, in some embodiments in each given breathing cycle 86, the decreasing the supply rate "SR" may be started substantially immediately after an end of the increasing the supply rate "SR", and closing/modulating toward the fully closed position "CL" (hereinafter, "closing") the set(s) of variable guide vanes 18, 19 may be started substantially immediately after an end of the opening/modulating toward the fully open position "OP" (hereinafter, "opening") the set(s) of variable guide vanes 18, 19.

Yet further as shown in FIG. 9, in some embodiments in each given breathing cycle 86, the opening the set(s) of variable guide vanes 18, 19 is simultaneous with at least part of the increasing the supply rate "SR", and the closing the set(s) of variable guide vanes 18, 19 is simultaneous with at least part of the decreasing the supply rate "SR". Yet further as shown in FIG. 9, in some embodiments in each given breathing cycle 86, the breathing-out phase 84 includes maintaining the set(s) of variable guide vanes 18, 19 closed, and maintaining the supply rate "SR" at the lower supply rate "LR".

As shown, in some embodiments, in the sequentially-next breathing out phase 84, the set(s) of variable guide vanes 18, 19 are further maintained closed for a pre-determined time period after the start of the sequentially-next breathing out phase 84. In some embodiments, this time delay is omitted, for example to suit a particular embodiment and/or application of the engine 10, 10', 10". In such embodiments, during the breathing-in phase 82 of a sequentially next breathing cycle 86, the opening the set(s) of variable guide vanes 18, 19 starts at a substantially same time as a start of increasing the supply rate "SR" of fuel to the combustor 13.

In some embodiments, the method 88 further includes monitoring, for example via the controller(s) 20' and corresponding sensor(s), a rotor speed "RS" (e.g. a relative rotational speed of the rotors 11, 12, 14, 15 in one non-limiting embodiment) of the engine 10, 10', 10", and in response to the rotor speed "RS" decreasing to a pre-determined sub-idle threshold "LT" during the breathing-out phase 84 of a given one of the breathing cycles 86, terminating the breathing-out phase 84 of the given cycle 86 and starting the breathing-in phase 82 of a sequentially next one of the breathing cycles 86. As shown, in some embodiments, during the breathing-in phase 82 of the sequentially next breathing cycle 86, the increasing the supply rate "SR" of fuel to the upper supply rate "UR" starts substantially immediately after the rotor speed "RS" reaches the pre-determined sub-idle threshold "LT", and thereby ensures that the rotor speed "RS" does not materially drop below the pre-determined sub-idle threshold "LT" speed.

Figure 11:
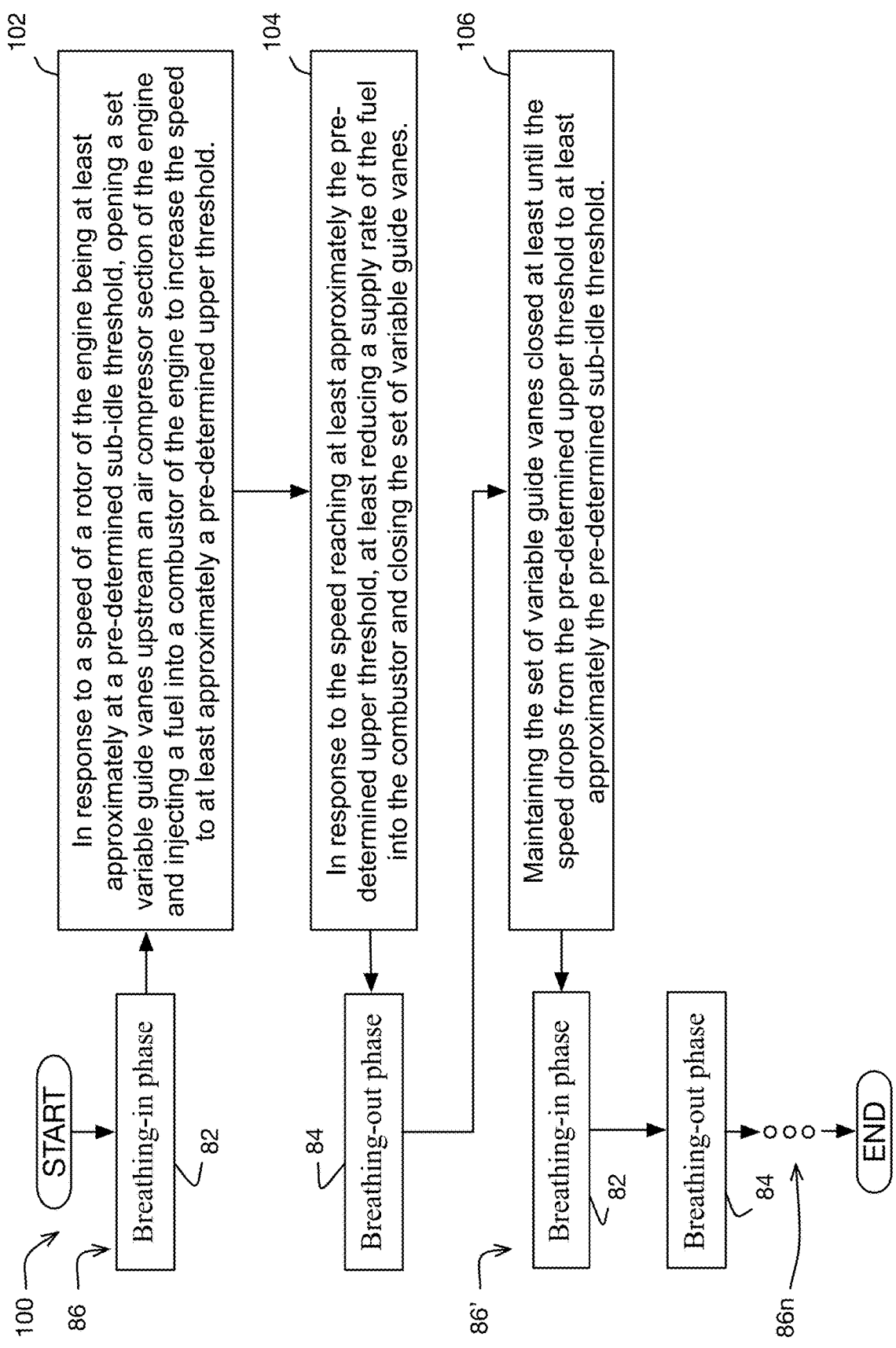
FIG. 11 is a schematic logic diagram showing a method implemented according to an embodiment of the present technology.

In another aspect and now referring to FIG. 11, the present technology further provides a method 100 of operating an engine 10, 10', 10" of a multi-engine aircraft 20, which includes operating the engine 10, 10', 10" in a sequential plurality of breathing cycles 86, 86' . . . 86n, with each of the breathing cycles 86, 86' . . . 86n including a breathing-in phase 82 followed by a breathing-out phase 84 as described above. For clarity, only the breathing-in phase 82 and the breathing-out phase 84 of one of the breathing cycles 86, 86' . . . 86n is shown in FIG. 11 in detail.

In some embodiments of the method 100, a given breathing-in phase 82 may include a step 102 of: i) in response to a speed of a gas generator rotor 11, 12, 14, 15 (hereinafter, "rotor") of the engine 10, 10', 10" being at least approximately at a pre-determined sub-idle threshold "LT", opening a set variable guide vanes 18 and/or 19 disposed upstream of an air compressor section 11, 12 of the engine 10, 10', 10" and injecting 104 a fuel into a combustor 13 of the engine 10, 10', 10" to increase the speed to at least approximately a pre-determined upper threshold "UT", followed by a step 104 of ii) in response to the speed reaching at least approximately the pre-determined upper threshold "UT", at least reducing a supply rate "SR" of the fuel into the combustor 13 and closing the set of variable guide vanes 18 and/or 19.

In some such embodiments, a given breathing-out phase 84 may include a step 106 of maintaining the set of variable guide vanes 18 and/or 19 closed at least until the speed of the rotor 11, 12, 14, 15 drops from the pre-determined upper threshold "UT" to at least approximately the pre-determined sub-idle threshold "LT". In some such embodiments, in the breathing-in phase 84 of at least one repeating breathing cycle 86 of the breathing cycles 86, the at least reducing the supply rate "SR" starts before a start of the closing the set of variable guide vanes 18 and/or 19. In some such embodiments, in the breathing-in phase 82 of at least one repeating breathing cycle 86 of the breathing cycles 86, the opening 102 the set of variable guide vanes 18 and/or 19 starts at least approximately simultaneously with the injecting the fuel into the combustor 13, and the injecting the fuel includes rapidly increasing, and more particularly spiking, the supply rate of the fuel into the combustor 13. In some such embodiments, the at least reducing 106 the supply rate includes reducing the supply rate to a zero supply rate.

It is contemplated that particular timings, including starts and stops, of the steps, relative to each other, of the methods 88, 100 described above for each given engine 10, 10', 10" may be determined based on and/or dictated by each particular embodiment of that engine 10, 10', 10" and/or that engine's 10, 10', 10" application, using for example conventional engineering and design methods.

Thus, now referring back to any one of FIGS. 1 to 5, the present technology provides a multi-engine aircraft 20, such as a multi-engine helicopter 20, that includes a first engine 10' operable to provide motive power to the aircraft 20, a second engine 10" operable to provide motive power to the aircraft 20, and at least one controller 20' operatively connected to the first and second engines 10', 10".

In some such embodiments, the controller 20', which may be one or more suitable controllers of the aircraft 20 and/or the engine(s) 10', 10" for example, is configured to operate the first engine 10' in a sub-idle mode while operating the second engine 10" in an active mode (further, "first sub-idle configuration"). In some such embodiments, the controller 20' is configured to operate the second engine 10" in a sub-idle mode while operating the first engine 10' in an active mode (further, "second sub-idle configuration"), either in addition to or instead of being configured to operate in the first sub-idle configuration. Since the first and second sub-idle configurations may be similar, only the first sub-idle configuration is described in detail herein next.

Referring also to FIG. 9, operating the first engine 10' in the sub-idle mode according to the present technology may include sequentially executing, by the controller(s) 20', a plurality of breathing cycles 86, with each cycle 86 of the plurality of cycles 86 including a breathing-in phase 82 followed by a breathing-out phase 84. In some embodiments, the breathing-in phase 82 may include: i) modulating a set of variable guide vanes 18 and/or 19 in FIG. 1 upstream an air compressor section 11, 12 of the first engine 10' to an open position, and a fuel supply to a combustor 13 of the first engine 10' to an upper supply rate "UR", followed by ii) modulating the set of variable guide vanes 18 and/or 19 to at least a substantially closed position, and the fuel supply to a lower supply rate "LR" that is lower than the upper supply rate "UR". In some embodiments, the breathing-out phase 84 may include maintaining the set of variable guide vanes 18 and/or 19 at least substantially closed, at least until a sequentially next breathing-in phase 82 for example.

In some embodiments, the modulating the set of variable guide vanes 18 and/or 19 to the open position includes modulating the set of variable guide vanes 18 and/or 19 to at least a substantially open position. In some such embodiments, the modulating the set of variable guide vanes 18 and/or 19 includes modulating the set of variable guide vanes 18 and/or 19 to a completely open position. In some embodiments, the closing the modulating the set of variable guide vanes 18 and/or 19 includes completely closing modulating the set of variable guide vanes 18 and/or 19. In some such embodiments, the maintaining the set of variable guide vanes 18 and/or 19 at least substantially closed includes maintaining the set of variable guide vanes 18 and/or 19 completely closed.

As shown in FIG. 9, in some embodiments the at least one controller 20' is configured to start the modulating the fuel supply to the lower supply rate "LR" substantially immediately after terminating the modulating the fuel supply to the upper supply rate "UR", and to start the modulating the set of variable guide vanes 18 and/or 19 to the closed position substantially immediately after terminating the modulating the set of variable guide vanes 18 and/or 19 to the open position.

This control logic may be said to provide for a "spiking" of the opening and closing the set of variable guide vanes 18 and/or 19, and for at least a partially simultaneous "spiking" of the fuel supply rate. In some such embodiments, the at least one controller 20' is configured to start the spiking the fuel supply rate at least substantially simultaneously with starting the spiking of the set of variable guide vanes 18 and/or 19, and to terminate the spiking the fuel supply rate at least substantially simultaneously with terminating the spiking of the set of variable guide vanes 18 and/or 19. In some embodiments and applications, the spiking of the fuel supply rate according to the present technology may reduce a rate of and/or a likelihood of fuel coking in fuel manifold sections of the engine 10, 10', 10" being operated in a sub-idle mode of the present technology, in comparison with at least some prior art engine idling methods for example.

In some embodiments and such as where the aircraft 20 is a helicopter for example, the at least one controller 20' is configured to switch operation of the first engine 10' from the sub-idle mode into an active mode of the first engine 10' at any point in time during operation of the first engine 10' in the sub-idle mode. Similarly, in some embodiments, the at least one controller 20' is configured to switch operation of the second engine 10" from the sub-idle mode into an active mode of the second engine 10" at any point in time during operation of the second engine 10" in the sub-idle mode. The at least one controller 20' may be therefore selectively operable between the first and second sub-idle configurations described above.

In some embodiments and such as where the aircraft 20 is a single engine application for example, the breathing control logic and methods described herein may be used to reduce fuel consumption at different stages of a given mission of the aircraft 20, such as an approach and a descent for instance, where no or almost no motive power is needed from the engine(s) 10', 10" of the aircraft 20. In some such applications, back-up systems and methods as described herein may be employed for example to supplement one or more systems, such as a bleed air system 27 for example, of the sub-idling engine(s) so as to ensure sustained operation of the system(s).

The particulars of how some of the functions described above are not described in detail to maintain clarity of this description, because the particulars may depend on each given embodiment of the aircraft 20 and the controller(s) 20' with which the present technology is implemented, and because the particulars may be implemented using suitable corresponding conventional components of the aircraft 20 and using suitable conventional control methods.

The above description is meant to be exemplary only, and one skilled in the art will recognize that changes may be made to the embodiments described without departing from the scope of the disclosed technology.

For example, in some embodiments, the sub-idling methods and technology described herein may be implemented by using dedicated actuated panel(s) 16' (FIG. 1) disposed at or in the air inlet(s) 16 of an engine 10 upstream of the compressor section(s) 11, 12, instead of or in addition to using the set(s) of variable guide vanes 18, 19. In some such embodiments, the panel(s) 16' may be configured to substantially completely shut off airflow to the respective air inlet(s) 16 when actuated to a closed position, and to substantially fully open the air inlet(s) 16 when actuated to an open position. Similar to the variable guide vanes 18, 19, actuation and control of the panel(s) 16' may be executed using any suitable actuator(s), and using any suitable controller(s) of the engine 10 and/or the aircraft 20.

As yet another example, as shown in FIGS. 2-5 for example, in some embodiments, one or more of the air systems 30, 40, 50 may include one or more pressure wave dampers 31, as described in the co-owned U.S. Patent Application entitled "AIR SYSTEM OF MULTI-ENGINE AIRCRAFT", U.S. Patent Application No. 62/855,131, filed on May 31, 2019 and expressly incorporated herein by reference. As stated in the 62/855,131 application, in some embodiments, the air systems 30, 40, 50 may further comprise one or more pressure wave dampers 31 in air communication with one or more of the air pressure lines/conduits 22-26. A non-limiting example of one of the pressure wave dampers 31 is shown in detail in FIG. 5. The term "pressure wave damper" as used herein includes all devices that may in the present art be referred to as a pressure wave arrestor, pressure wave suppressor, pressure wave attenuator, and the like, and their equivalents including one or more branch pipes configured to filter out one or more frequencies associated with the unwanted pressure waves. The pressure wave damper(s) 31 may absorb and/or dampen and/or attenuate at least some of the pressure waves/pulses/air pressure fluctuations/pulsations in the air pressure line(s)/conduit(s) 22-26 that may be generated during operation of the air systems 30, 40, 50, such as through executing the various methods 60, 70 described above for example.

In at least some cases, like steady state operation, this may help reduce a likelihood of standing wave resonances in the air systems 30, 40, 50, and may help prolong an expected life cycle of the air systems 30, 40, 50. In at least some embodiments, at least some of the pressure wave dampers 31 are made large enough to act as resonators during steady state engine operation, thereby helping dissipate transient/surge pressure within the respective line(s) to which it/they are connected. For example, for effectiveness during a steady state operation, the neck dimensions (length and diameter) of a given pressure wave damper 31 may be tuned to resonate with the accompanying volume of the given pressure wave damper 31 at the most prevalent excitation frequency and/or an Eigen frequency of the corresponding air pressure line, to dissipate energy that may be imparted to the air pressure line, for example as a result of a control valve operation and/or a switchover of an engine from a standby mode to an active mode and/or vice versa, prior to distressing the air pressure line.

As shown, in some embodiments, the pressure wave damper(s) 31 may be fluidly connected into the air systems 30, 40, 50 at locations proximate to one or more of the valves, for example valves 22', 24', 24", 28, 41, 42, of the air systems 30, 40, 50. Also as shown, in some embodiments, the pressure wave damper(s) 31 may be fluidly connected into the air systems 30, 40, 50 at locations each of which may have been determined to correspond to an air pressure maxima, and/or a maximum of a pressure wave inside the corresponding duct(s), pipe(s) or other air conduit(s), in the respective air system 30, 40, 50. Such positioning may help further reduce a likelihood of, and in some embodiments and applications prevent, standing wave resonances in the air systems 30, 40, 50, and may further help prolong life of the air systems 30, 40, 50.

More particularly, the air pressure maximums may be determined at one or more switch-over conditions of the air systems 30, 40, 50, as described above (a.k.a. transient operation), during which the air systems 30, 40, 50 may switch, for example: a) from supplying one of the engines 10', 10" with supplemental compressed air to supplying another one of the engines 10', 10" with supplemental compressed air, or b) from not supplying any supplemental compressed air to any of the engines 10', 10" to supplying supplemental compressed air to at least one of the engines 10', 10". More particularly, for a given air pressure line having a control valve, such as one or more of the control valves 28, 41, 42 for example, the air pressure maximum, and/or the maximum of a pressure wave, may be calculated (e.g. by modeling) as a maximum air pressure in the air pressure line when the control valve switches between one of: i) from fluidly blocking the air pressure line to fluidly unblocking the air pressure line, and ii) from fluidly unblocking the air pressure line to fluidly blocking the air pressure line.

In some embodiments, one or more of the pressure wave damper 31 may be a Helmholtz resonator. In some embodiments, one or more of the pressure wave damper 31 may include a membrane/diaphragm that is fluidly and/or mechanically pressurized to enhance a frequency response of the respective air systems 30, 40, 50. In some embodiments, one or more of the pressure wave damper 31 may include a resonator volume that absorbs and/or attenuates and/or dissipates shockwaves and/or pressure oscillations and/or other aerodynamic instabilities. In some such embodiments, the resonator volume(s) may be spherical, cylindrical, or a 3D complex shape for example, and may be made sufficiently large to dissipate transient/surge pressure within the respective air lines, to assist in mitigating stresses during the transient operations of the air systems 30, 40, 50.

Also, in some embodiments, one or more of the pressure wave dampers 31 may include a neck 32 (numbered in FIG. 2 only, to preserve clarity of the figures) that fluidly connects the resonator volume(s) to the respective air lines. In some such embodiments, the resonator neck dimensions, including a length and diameter thereof, may be selected to resonate with the corresponding resonator volume(s) at a prevalent excitation frequency and/or at an Eigen frequency of the corresponding air line. In at least some cases, such dimensioning may help reduce stresses experienced by the respective air systems 30, 40, 50 during steady state operation. Also, in some embodiments, such as where a Helmholtz resonator is used, the Helmholtz resonator may have an opening having an opening area (A), a neck with a length (L), and a volume (V). In such embodiments, the resonator frequency response of the Helmholtz resonator, or resonance, which may be tuned, may be expressed as the following function: $V = c0/2/pi * sqrt(A/V/L)$, where c0 is the velocity of the sound.

As yet another example, in the methods described above the vanes 18, 19 in a first part of the breathing-in phases 82 are modulated to at least a substantially open position. In some embodiments, and depending on the particular embodiment of the engine 10 for example, one or more of the breathing-in phases 82 may include opening the respective set(s) of vanes 18, 19 to a position in a range of 70% to 100% of fully open. In some embodiments, one or more of the breathing-in phases 82 may include opening the respective set(s) of vanes 18, 19 to a position in a range of 70% to 90% of fully open. In some embodiments, one or more of the breathing-in phases 82 may include opening the respective set(s) of vanes 18, 19 to a position in a range of 80% to 90% of fully open. In some embodiments, one or more of the breathing-in phases 82 may include opening the respective set(s) of vanes 18, 19 to a position in a range of 90% to 100% of fully open.

As yet another example, in the methods described above the vanes 18, 19 in a second part of the breathing-in phases 82 are modulated to at least a substantially closed position. In some embodiments, and depending on the particular embodiment of the engine 10 for example, one or more of the breathing-in phases 82 may include opening the respective set(s) of vanes 18, 19 to a position in a range of 0% to 10% of fully open. In some embodiments, one or more of the breathing-in phases 82 may include opening the respective set(s) of vanes 18, 19 to a position in a range of 0% to 5% of fully open. In some embodiments, one or more of the breathing-in phases 82 may include opening the respective set(s) of vanes 18, 19 to a position in a range of 0% to 1% of fully open. In some embodiments, one or more of the breathing-in phases 82 may include opening the respective set(s) of vanes 18, 19 to a position in a range of 1% to 2% of fully open. In some embodiments, one or more of the breathing-in phases 82 may include opening the respective set(s) of vanes 18, 19 to a position in a range of 1% to 4% of fully open. It will be appreciated that in at least some cases, fully open and fully closed positions of each given vane set 18, 19 may be different for different embodiments of the corresponding engine and-or rotor(s) and-or may be for example modified to suit and-or optimize each particular embodiment of engine.

As yet another example, while the systems and methods described above may have been described individually, in some embodiments, one or more of the systems and methods above may be used in combination with one or more of the other systems and methods described above. In some such cases, multiple different systems and methods may be implemented using any suitable control system(s). As a non-limiting example, the systems and methods described above, and-or combinations thereof, may be implemented using any control systems, including controllers, sensors, actuators and the like, which may be for example conventional control elements, which may be selected to suit each particular embodiment of the aircraft and engine(s) incorporating and using the systems and methods. To maintain clarity of this description, such conventional elements and details have not been described herein in detail. As an example, the controllers described and shown above may be used to implement the methods described above, and may be for example one or more full authority digital controllers (FADEC).

Still other modifications than those given above as non-limiting examples, and which fall within the scope of the present disclosure, will be apparent to those skilled in the art in light of a review of this disclosure.

The invention claimed is:

1. A method of operating an engine of a multi-engine aircraft, comprising:
    sequentially operating the engine through a plurality of cycles, a given cycle of the plurality of cycles including a breathing-in phase followed by a breathing-out phase, the breathing-in phase including:
        i) in response to a speed of a rotor of the engine being at a sub-idle threshold, opening a set of variable guide vanes upstream an air compressor section of the engine and injecting a fuel into a combustor of the engine to increase the speed to at least approximately a pre-determined upper threshold, and then
        ii) in response to the speed reaching the pre-determined upper threshold, at least reducing a supply rate of the fuel into the combustor and at least substantially closing the set of variable guide vanes,
    the breathing-out phase including maintaining the set of variable guide vanes closed at least until the speed drops from the pre-determined upper threshold to at least approximately the pre-determined sub-idle threshold.

2. The method of claim 1, wherein in the breathing-in phase of at least one repeating cycle of the plurality of cycles, the at least reducing the rate starts before a start of the closing the set of variable guide vanes.

3. The method of claim 1, wherein in the breathing-in phase of at least one repeating cycle of the plurality of cycles, the opening the set of variable guide vanes starts at least approximately simultaneously with the injecting the fuel, and the injecting the fuel includes increasing the supply rate of the fuel into the combustor.

4. The method of claim 1, wherein the at least reducing the rate includes reducing the rate to a zero supply rate.

5. The method of claim 1, wherein the step of injecting the fuel into the combustor of the engine comprises spiking the supply rate of fuel flow into the combustor, the spiking and the opening of the set of variable guide vanes being timed to increase the speed of the rotor to the pre-determined upper threshold.

6. The method of claim 5, wherein the spiking the supply rate includes increasing the rate is to an upper supply rate, followed by decreasing the rate to a lower supply rate, the upper supply rate being lower than a minimum fuel supply rate required for the engine to provide motive power to the multi-engine aircraft and greater than a substantially constant idle fuel supply rate required to maintain rotation of the rotor at a substantially constant idle rotation speed of the engine, the lower supply rate being lower than the upper supply rate, and wherein the opening the set of variable guide vanes is followed substantially immediately by the substantially closing the set of variable guide vanes.

7. The method of claim 1, further comprising monitoring the speed of the rotor, and in response to the speed of the rotor decreasing to the pre-determined sub-idle threshold during the breathing-out phase of the given cycle, terminating the breathing-out phase of the given cycle and starting the breathing-in phase of a sequentially next cycle of the plurality of cycles.

8. The method of claim 7, wherein during the breathing-in phase of the sequentially next cycle, injecting the fuel starts substantially immediately after the speed of the rotor reaches the pre-determined upper threshold during the breathing-out phase of the given cycle.

9. The method of claim 7, wherein during the breathing-in phase of the sequentially next cycle, opening the set of variable guide vanes starts at one of: i) a substantially same time as a start of injecting the fuel, and ii) a pre-determined time after the start of injecting the fuel.

10. A multi-engine aircraft, comprising:
    a first engine operable to provide motive power to the aircraft;
    a second engine operable to provide motive power to the aircraft;
    at least one controller operatively connected to the first engine and the second engines and configured to operate the first engine in a sub-idle mode while operating the second engine in an active mode, the sub-idle mode including sequentially executing a plurality of cycles, a given cycle of the plurality of cycles including a breathing-in phase followed by a breathing-out phase, the breathing-in phase including: i) modulating a set of variable guide vanes upstream an air compressor section of the first engine to an open position, and modulating a fuel supply to a combustor of the first engine to an upper supply rate to increase a speed of a rotor of the first engine to an upper speed threshold, followed by ii) modulating the set of variable guide vanes to a substantially closed position, and modulating the fuel supply to a lower supply rate that is lower than the upper supply rate, in response to the speed of the rotor of the first engine reaching the upper speed threshold, and
    the breathing-out phase including maintaining the set of variable guide vanes closed.

11. The aircraft of claim 10, wherein the at least one controller is configured to start the modulating of the fuel supply to the lower supply rate substantially immediately after terminating the modulating the fuel supply to the upper supply rate, and to start the modulating the set of variable guide vanes to the closed position substantially immediately after terminating the modulating the set of variable guide vanes to the open position.

12. The aircraft of claim 10, wherein the at least one controller is configured to switch operation of the first engine from the sub-idle mode into an active mode of the first engine at any point in time during operation of the first engine in the sub-idle mode.

13. The aircraft of claim 10, wherein the modulating the fuel supply to the lower supply rate followed by modulating the fuel supply to the upper supply rate is part of spiking the fuel supply to the combustor of the first engine.

14. The aircraft of claim 13, wherein the at least one controller is configured to start the spiking at least substantially simultaneously with starting the modulating the set of variable guide vanes to the open position, and to terminate the spiking at least substantially simultaneously with terminating the modulating the set of variable guide vanes to the closed position.

15. The aircraft of claim 10, wherein the breathing-out phase includes maintaining the set of variable guide vanes closed at least until the speed of the rotor drops from the upper speed threshold to a sub-idle speed threshold.

\* \* \* \* \*